US009703636B2

(12) United States Patent
Lucas et al.

(10) Patent No.: US 9,703,636 B2
(45) Date of Patent: Jul. 11, 2017

(54) FIRMWARE REVERSION TRIGGER AND CONTROL

(71) Applicant: SanDisk Enterprise IP LLC, Milpitas, CA (US)

(72) Inventors: Gregg S. Lucas, Tucson, AZ (US); Robert W. Ellis, Phoenix, AZ (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 40 days.

(21) Appl. No.: 14/331,033

(22) Filed: Jul. 14, 2014

(65) Prior Publication Data

US 2015/0248334 A1 Sep. 3, 2015

Related U.S. Application Data

(60) Provisional application No. 61/946,729, filed on Mar. 1, 2014.

(51) Int. Cl.
*G06F 11/00* (2006.01)
*G06F 11/14* (2006.01)
(52) U.S. Cl.
CPC .................. *G06F 11/1433* (2013.01)
(58) Field of Classification Search
CPC .............. G06F 11/1417; G06F 11/201; G06F 11/2089; G06F 11/2017
See application file for complete search history.

(56) References Cited

U.S. PATENT DOCUMENTS

| 4,173,737 A | 11/1979 | Skerlos et al. |
| 4,888,750 A | 12/1989 | Kryder et al. |
| 4,916,652 A | 4/1990 | Schwarz et al. |
| 5,129,089 A | 7/1992 | Nielsen |
| 5,270,979 A | 12/1993 | Harari et al. |

(Continued)

FOREIGN PATENT DOCUMENTS

| EP | 1 299 800 | 4/2003 |
| EP | 1 465 203 A1 | 10/2004 |

(Continued)

OTHER PUBLICATIONS

Gasior, "Gigabyte's i-Ram storage device Ram disk without the fuss", Jan. 25, 2006, The Tech Report, p. 1.*

(Continued)

*Primary Examiner* — Bryce Bonzo
*Assistant Examiner* — Jonathan Gibson
(74) *Attorney, Agent, or Firm* — Morgan, Lewis & Bockius LLP

(57) ABSTRACT

The various embodiments described herein include systems, methods and/or devices used to enable firmware reversion triggering and control in a storage device. In one aspect, the method includes: (1) detecting a reversion trigger, the reversion trigger identifying a set of one or more controllers of a plurality of controllers on the storage device, and (2) in response to the reversion trigger, initiating recovery actions for each controller in the set of one or more controllers, including: for each controller in the set of one or more controllers: (a) asserting a revert signal to the controller to execute a firmware reversion for the controller, and (b) resetting the controller subsequent to asserting the revert signal to the controller.

22 Claims, 9 Drawing Sheets

(56) References Cited

U.S. PATENT DOCUMENTS

| | | |
|---|---|---|
| 5,329,491 A | 7/1994 | Brown et al. |
| 5,381,528 A | 1/1995 | Brunelle |
| 5,404,485 A | 4/1995 | Ban |
| 5,488,702 A | 1/1996 | Byers et al. |
| 5,519,847 A | 5/1996 | Fandrich et al. |
| 5,530,705 A | 6/1996 | Malone |
| 5,537,555 A | 7/1996 | Landry |
| 5,551,003 A | 8/1996 | Mattson et al. |
| 5,636,342 A | 6/1997 | Jeffries |
| 5,657,332 A | 8/1997 | Auclair et al. |
| 5,666,114 A | 9/1997 | Brodie et al. |
| 5,708,849 A | 1/1998 | Coke et al. |
| 5,765,185 A | 6/1998 | Lambrache et al. |
| 5,890,193 A | 3/1999 | Chevallier |
| 5,930,188 A | 7/1999 | Roohparvar |
| 5,936,884 A | 8/1999 | Hasbun et al. |
| 5,943,692 A | 8/1999 | Marberg et al. |
| 5,946,714 A | 8/1999 | Miyauchi |
| 5,982,664 A | 11/1999 | Watanabe |
| 6,000,006 A | 12/1999 | Bruce et al. |
| 6,006,345 A | 12/1999 | Berry, Jr. |
| 6,016,560 A | 1/2000 | Wada et al. |
| 6,018,304 A | 1/2000 | Bessios |
| 6,044,472 A | 3/2000 | Crohas |
| 6,070,074 A | 5/2000 | Perahia et al. |
| 6,104,304 A | 8/2000 | Clark et al. |
| 6,119,250 A | 9/2000 | Nishimura et al. |
| 6,138,261 A | 10/2000 | Wilcoxson et al. |
| 6,182,264 B1 | 1/2001 | Ott |
| 6,192,092 B1 | 2/2001 | Dizon et al. |
| 6,260,120 B1 | 7/2001 | Blumenau et al. |
| 6,295,592 B1 | 9/2001 | Jeddeloh et al. |
| 6,311,263 B1 | 10/2001 | Barlow et al. |
| 6,408,394 B1 | 6/2002 | Vander Kamp et al. |
| 6,412,042 B1 | 6/2002 | Paterson et al. |
| 6,442,076 B1 | 8/2002 | Roohparvar |
| 6,449,625 B1 | 9/2002 | Wang |
| 6,484,224 B1 | 11/2002 | Robins et al. |
| 6,516,437 B1 | 2/2003 | Van Stralen et al. |
| 6,564,285 B1 | 5/2003 | Mills et al. |
| 6,647,387 B1 | 11/2003 | McKean et al. |
| 6,675,258 B1* | 1/2004 | Bramhall ................ G06F 8/65 711/100 |
| 6,678,788 B1 | 1/2004 | O'Connell |
| 6,728,879 B1 | 4/2004 | Atkinson |
| 6,757,768 B1 | 6/2004 | Potter et al. |
| 6,775,792 B2 | 8/2004 | Ulrich et al. |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,865,650 B1 | 3/2005 | Morley et al. |
| 6,871,257 B2 | 3/2005 | Conley et al. |
| 6,895,464 B2 | 5/2005 | Chow et al. |
| 6,934,755 B1 | 8/2005 | Saulpaugh et al. |
| 6,966,006 B2 | 11/2005 | Pacheco et al. |
| 6,978,343 B1 | 12/2005 | Ichiriu |
| 6,980,985 B1 | 12/2005 | Amer-Yahia et al. |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,024,514 B2 | 4/2006 | Mukaida et al. |
| 7,028,165 B2 | 4/2006 | Roth et al. |
| 7,032,123 B2 | 4/2006 | Kane et al. |
| 7,043,505 B1 | 5/2006 | Teague et al. |
| 7,076,598 B2 | 7/2006 | Wang |
| 7,100,002 B2 | 8/2006 | Shrader et al. |
| 7,102,860 B2 | 9/2006 | Wenzel |
| 7,111,293 B1 | 9/2006 | Hersh et al. |
| 7,126,873 B2 | 10/2006 | See et al. |
| 7,133,282 B2 | 11/2006 | Sone |
| 7,155,579 B1 | 12/2006 | Neils et al. |
| 7,162,678 B2 | 1/2007 | Saliba |
| 7,173,852 B2 | 2/2007 | Gorobets et al. |
| 7,184,446 B2 | 2/2007 | Rashid et al. |
| 7,212,440 B2 | 5/2007 | Gorobets |
| 7,269,755 B2* | 9/2007 | Moshayedi ......... G06F 11/1441 714/2 |
| 7,275,170 B2 | 9/2007 | Suzuki |
| 7,295,479 B2 | 11/2007 | Yoon et al. |
| 7,328,377 B1 | 2/2008 | Lewis et al. |
| 7,426,633 B2* | 9/2008 | Thompson ................ G06F 8/65 713/1 |
| 7,486,561 B2 | 2/2009 | Mokhlesi |
| 7,516,292 B2 | 4/2009 | Kimura et al. |
| 7,523,157 B2 | 4/2009 | Aguilar, Jr. et al. |
| 7,527,466 B2 | 5/2009 | Simmons |
| 7,529,466 B2 | 5/2009 | Takahashi |
| 7,533,214 B2 | 5/2009 | Aasheim et al. |
| 7,546,478 B2 | 6/2009 | Kubo et al. |
| 7,566,987 B2 | 7/2009 | Black et al. |
| 7,571,277 B2 | 8/2009 | Mizushima |
| 7,574,554 B2 | 8/2009 | Tanaka et al. |
| 7,596,643 B2 | 9/2009 | Merry et al. |
| 7,669,003 B2 | 2/2010 | Sinclair et al. |
| 7,681,106 B2 | 3/2010 | Jarrar et al. |
| 7,685,494 B1 | 3/2010 | Varnica et al. |
| 7,707,481 B2 | 4/2010 | Kirschner et al. |
| 7,761,655 B2 | 7/2010 | Mizushima et al. |
| 7,765,454 B2 | 7/2010 | Passint |
| 7,774,390 B2 | 8/2010 | Shin |
| 7,809,836 B2* | 10/2010 | Mihm ................ G06F 8/65 709/227 |
| 7,840,762 B2 | 11/2010 | Oh et al. |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,945,825 B2 | 5/2011 | Cohen et al. |
| 7,954,041 B2 | 5/2011 | Hong et al. |
| 7,971,112 B2 | 6/2011 | Murata |
| 7,974,368 B2 | 7/2011 | Shieh et al. |
| 7,978,516 B2 | 7/2011 | Olbrich |
| 7,996,642 B1 | 8/2011 | Smith |
| 8,006,161 B2 | 8/2011 | Lestable et al. |
| 8,032,724 B1 | 10/2011 | Smith |
| 8,041,884 B2 | 10/2011 | Chang |
| 8,042,011 B2 | 10/2011 | Nicolaidis et al. |
| 8,069,390 B2 | 11/2011 | Lin |
| 8,190,967 B2 | 5/2012 | Hong et al. |
| 8,250,380 B2 | 8/2012 | Guyot |
| 8,254,181 B2 | 8/2012 | Hwang et al. |
| 8,259,506 B1 | 9/2012 | Sommer et al. |
| 8,261,020 B2 | 9/2012 | Krishnaprasad et al. |
| 8,312,349 B2 | 11/2012 | Reche et al. |
| 8,385,117 B2 | 2/2013 | Sakurada et al. |
| 8,412,985 B1 | 4/2013 | Bowers et al. |
| 8,429,436 B2 | 4/2013 | Fillingim et al. |
| 8,438,459 B2 | 5/2013 | Cho et al. |
| 8,453,022 B2 | 5/2013 | Katz |
| 8,473,680 B1 | 6/2013 | Pruthi |
| 8,510,499 B1 | 8/2013 | Banerjee |
| 8,531,888 B2 | 9/2013 | Chilappagari et al. |
| 8,554,984 B2 | 10/2013 | Yano et al. |
| 8,627,117 B2 | 1/2014 | Johnston |
| 8,634,248 B1 | 1/2014 | Sprouse et al. |
| 8,694,854 B1 | 4/2014 | Dar et al. |
| 8,700,842 B2 | 4/2014 | Dinker |
| 8,724,789 B2 | 5/2014 | Altberg et al. |
| 8,775,741 B1 | 7/2014 | de la Iglesia |
| 8,788,778 B1 | 7/2014 | Boyle |
| 8,832,384 B1 | 9/2014 | de la Iglesia |
| 8,849,825 B1 | 9/2014 | McHugh et al. |
| 8,874,992 B2 | 10/2014 | Desireddi et al. |
| 8,885,434 B2 | 11/2014 | Kumar |
| 8,898,373 B1 | 11/2014 | Kang et al. |
| 8,909,894 B1 | 12/2014 | Singh et al. |
| 8,910,030 B2 | 12/2014 | Goel |
| 8,923,066 B1 | 12/2014 | Subramanian et al. |
| 9,002,805 B1 | 4/2015 | Barber et al. |
| 9,043,517 B1 | 5/2015 | Sprouse et al. |
| 9,052,942 B1 | 6/2015 | Barber et al. |
| 9,063,946 B1 | 6/2015 | Barber et al. |

(56) References Cited

U.S. PATENT DOCUMENTS

| | | | |
|---|---|---|---|
| 9,110,843 B2* | 8/2015 | Chiu | G06F 8/665 |
| 9,128,690 B2 | 9/2015 | Lotzenburger et al. | |
| 9,329,789 B1 | 5/2016 | Chu et al. | |
| 9,355,060 B1 | 5/2016 | Barber et al. | |
| 9,417,917 B1 | 8/2016 | Barber et al. | |
| 2001/0026949 A1 | 10/2001 | Ogawa et al. | |
| 2001/0050824 A1 | 12/2001 | Buch | |
| 2002/0024846 A1 | 2/2002 | Kawahara et al. | |
| 2002/0032891 A1 | 3/2002 | Yada et al. | |
| 2002/0036515 A1 | 3/2002 | Eldridge et al. | |
| 2002/0083299 A1 | 6/2002 | Van Huben et al. | |
| 2002/0099904 A1 | 7/2002 | Conley | |
| 2002/0116651 A1 | 8/2002 | Beckert et al. | |
| 2002/0122334 A1 | 9/2002 | Lee et al. | |
| 2002/0152305 A1 | 10/2002 | Jackson et al. | |
| 2002/0162075 A1 | 10/2002 | Talagala et al. | |
| 2002/0165896 A1 | 11/2002 | Kim | |
| 2003/0041299 A1 | 2/2003 | Kanazawa et al. | |
| 2003/0043829 A1 | 3/2003 | Rashid | |
| 2003/0079172 A1 | 4/2003 | Yamagishi et al. | |
| 2003/0088805 A1 | 5/2003 | Majni et al. | |
| 2003/0093628 A1 | 5/2003 | Matter et al. | |
| 2003/0163594 A1 | 8/2003 | Aasheim et al. | |
| 2003/0163629 A1 | 8/2003 | Conley et al. | |
| 2003/0188045 A1 | 10/2003 | Jacobson | |
| 2003/0189856 A1 | 10/2003 | Cho et al. | |
| 2003/0198100 A1 | 10/2003 | Matsushita et al. | |
| 2003/0204341 A1 | 10/2003 | Guliani et al. | |
| 2003/0212719 A1 | 11/2003 | Yasuda et al. | |
| 2003/0225961 A1 | 12/2003 | Chow et al. | |
| 2004/0024957 A1 | 2/2004 | Lin et al. | |
| 2004/0024963 A1 | 2/2004 | Talagala et al. | |
| 2004/0057575 A1 | 3/2004 | Zhang et al. | |
| 2004/0062157 A1 | 4/2004 | Kawabe | |
| 2004/0073829 A1 | 4/2004 | Olarig | |
| 2004/0085849 A1 | 5/2004 | Myoung et al. | |
| 2004/0114265 A1 | 6/2004 | Talbert | |
| 2004/0143710 A1 | 7/2004 | Walmsley | |
| 2004/0148561 A1 | 7/2004 | Shen et al. | |
| 2004/0153902 A1 | 8/2004 | Machado et al. | |
| 2004/0158775 A1 | 8/2004 | Shibuya et al. | |
| 2004/0167898 A1 | 8/2004 | Margolus et al. | |
| 2004/0181734 A1 | 9/2004 | Saliba | |
| 2004/0199714 A1 | 10/2004 | Estakhri et al. | |
| 2004/0210706 A1 | 10/2004 | In et al. | |
| 2004/0237018 A1 | 11/2004 | Riley | |
| 2005/0060456 A1 | 3/2005 | Shrader et al. | |
| 2005/0060501 A1 | 3/2005 | Shrader | |
| 2005/0073884 A1 | 4/2005 | Gonzalez et al. | |
| 2005/0108588 A1 | 5/2005 | Yuan | |
| 2005/0114587 A1 | 5/2005 | Chou et al. | |
| 2005/0138442 A1 | 6/2005 | Keller, Jr. et al. | |
| 2005/0144358 A1 | 6/2005 | Conley et al. | |
| 2005/0144361 A1 | 6/2005 | Gonzalez et al. | |
| 2005/0144367 A1 | 6/2005 | Sinclair | |
| 2005/0144516 A1 | 6/2005 | Gonzalez et al. | |
| 2005/0154825 A1 | 7/2005 | Fair | |
| 2005/0172065 A1 | 8/2005 | Keays | |
| 2005/0172207 A1 | 8/2005 | Radke et al. | |
| 2005/0193161 A1 | 9/2005 | Lee et al. | |
| 2005/0201148 A1 | 9/2005 | Chen et al. | |
| 2005/0210348 A1 | 9/2005 | Totsuka | |
| 2005/0231765 A1 | 10/2005 | So et al. | |
| 2005/0249013 A1 | 11/2005 | Janzen et al. | |
| 2005/0251617 A1 | 11/2005 | Sinclair et al. | |
| 2005/0257120 A1 | 11/2005 | Gorobets et al. | |
| 2005/0273560 A1 | 12/2005 | Hulbert et al. | |
| 2005/0281088 A1 | 12/2005 | Ishidoshiro et al. | |
| 2005/0289314 A1 | 12/2005 | Adusumilli et al. | |
| 2006/0010174 A1 | 1/2006 | Nguyen et al. | |
| 2006/0039196 A1 | 2/2006 | Gorobets et al. | |
| 2006/0039227 A1 | 2/2006 | Lai et al. | |
| 2006/0053246 A1 | 3/2006 | Lee | |
| 2006/0062054 A1 | 3/2006 | Hamilton et al. | |
| 2006/0069932 A1* | 3/2006 | Oshikawa | G06F 1/3203 713/300 |
| 2006/0085671 A1 | 4/2006 | Majni et al. | |
| 2006/0087893 A1 | 4/2006 | Nishihara et al. | |
| 2006/0103480 A1 | 5/2006 | Moon et al. | |
| 2006/0107181 A1 | 5/2006 | Dave et al. | |
| 2006/0136570 A1 | 6/2006 | Pandya | |
| 2006/0136655 A1 | 6/2006 | Gorobets et al. | |
| 2006/0136681 A1 | 6/2006 | Jain et al. | |
| 2006/0156177 A1 | 7/2006 | Kottapalli et al. | |
| 2006/0184738 A1 | 8/2006 | Bridges et al. | |
| 2006/0195650 A1 | 8/2006 | Su et al. | |
| 2006/0209592 A1 | 9/2006 | Li et al. | |
| 2006/0224841 A1 | 10/2006 | Terai et al. | |
| 2006/0244049 A1 | 11/2006 | Yaoi et al. | |
| 2006/0259528 A1 | 11/2006 | Dussud et al. | |
| 2006/0265568 A1 | 11/2006 | Burton | |
| 2006/0291301 A1 | 12/2006 | Ziegelmayer | |
| 2007/0011413 A1 | 1/2007 | Nonaka et al. | |
| 2007/0033376 A1 | 2/2007 | Sinclair et al. | |
| 2007/0058446 A1 | 3/2007 | Hwang et al. | |
| 2007/0061597 A1 | 3/2007 | Holtzman et al. | |
| 2007/0076479 A1 | 4/2007 | Kim et al. | |
| 2007/0081408 A1 | 4/2007 | Kwon et al. | |
| 2007/0083697 A1 | 4/2007 | Birrell et al. | |
| 2007/0088716 A1 | 4/2007 | Brumme et al. | |
| 2007/0091677 A1 | 4/2007 | Lasser et al. | |
| 2007/0101096 A1 | 5/2007 | Gorobets | |
| 2007/0106679 A1 | 5/2007 | Perrin et al. | |
| 2007/0113019 A1 | 5/2007 | Beukema | |
| 2007/0133312 A1 | 6/2007 | Roohparvar | |
| 2007/0147113 A1 | 6/2007 | Mokhlesi et al. | |
| 2007/0150790 A1 | 6/2007 | Gross et al. | |
| 2007/0156842 A1 | 7/2007 | Vermeulen et al. | |
| 2007/0157064 A1 | 7/2007 | Falik et al. | |
| 2007/0174579 A1 | 7/2007 | Shin | |
| 2007/0180188 A1 | 8/2007 | Fujibayashi et al. | |
| 2007/0180346 A1 | 8/2007 | Murin | |
| 2007/0191993 A1 | 8/2007 | Wyatt | |
| 2007/0201274 A1 | 8/2007 | Yu et al. | |
| 2007/0204128 A1 | 8/2007 | Lee et al. | |
| 2007/0208901 A1 | 9/2007 | Purcell et al. | |
| 2007/0234143 A1 | 10/2007 | Kim | |
| 2007/0245061 A1 | 10/2007 | Harriman | |
| 2007/0245099 A1 | 10/2007 | Gray et al. | |
| 2007/0263442 A1 | 11/2007 | Cornwell et al. | |
| 2007/0268754 A1 | 11/2007 | Lee et al. | |
| 2007/0277036 A1 | 11/2007 | Chamberlain et al. | |
| 2007/0279988 A1 | 12/2007 | Nguyen | |
| 2007/0291556 A1 | 12/2007 | Kamei | |
| 2007/0294496 A1 | 12/2007 | Goss et al. | |
| 2007/0300130 A1 | 12/2007 | Gorobets | |
| 2008/0013390 A1 | 1/2008 | Zipprich-Rasch | |
| 2008/0019182 A1 | 1/2008 | Yanagidaira et al. | |
| 2008/0022163 A1 | 1/2008 | Tanaka et al. | |
| 2008/0028275 A1 | 1/2008 | Chen et al. | |
| 2008/0043871 A1 | 2/2008 | Latouche et al. | |
| 2008/0052446 A1 | 2/2008 | Lasser et al. | |
| 2008/0052451 A1 | 2/2008 | Pua et al. | |
| 2008/0056005 A1 | 3/2008 | Aritome | |
| 2008/0059602 A1 | 3/2008 | Matsuda et al. | |
| 2008/0071971 A1 | 3/2008 | Kim et al. | |
| 2008/0077841 A1 | 3/2008 | Gonzalez et al. | |
| 2008/0077937 A1 | 3/2008 | Shin et al. | |
| 2008/0086677 A1 | 4/2008 | Yang et al. | |
| 2008/0112226 A1 | 5/2008 | Mokhlesi | |
| 2008/0141043 A1 | 6/2008 | Flynn et al. | |
| 2008/0144371 A1 | 6/2008 | Yeh et al. | |
| 2008/0147714 A1 | 6/2008 | Breternitz et al. | |
| 2008/0147964 A1 | 6/2008 | Chow et al. | |
| 2008/0147998 A1 | 6/2008 | Jeong | |
| 2008/0148124 A1 | 6/2008 | Zhang et al. | |
| 2008/0163030 A1 | 7/2008 | Lee | |
| 2008/0168191 A1 | 7/2008 | Biran et al. | |
| 2008/0168319 A1 | 7/2008 | Lee et al. | |
| 2008/0170460 A1 | 7/2008 | Oh et al. | |
| 2008/0180084 A1 | 7/2008 | Dougherty et al. | |
| 2008/0209282 A1 | 8/2008 | Lee et al. | |
| 2008/0229000 A1 | 9/2008 | Kim | |

(56) References Cited

U.S. PATENT DOCUMENTS

| | | |
|---|---|---|
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2008/0313132 A1 | 12/2008 | Hao et al. |
| 2008/0320110 A1* | 12/2008 | Pathak .............. G06F 11/1433 709/220 |
| 2009/0003046 A1 | 1/2009 | Nirschl et al. |
| 2009/0003058 A1 | 1/2009 | Kang |
| 2009/0019216 A1 | 1/2009 | Yamada et al. |
| 2009/0031083 A1 | 1/2009 | Willis et al. |
| 2009/0037652 A1 | 2/2009 | Yu et al. |
| 2009/0070608 A1 | 3/2009 | Kobayashi |
| 2009/0116283 A1 | 5/2009 | Ha et al. |
| 2009/0125671 A1 | 5/2009 | Flynn et al. |
| 2009/0144598 A1 | 6/2009 | Yoon et al. |
| 2009/0158288 A1 | 6/2009 | Fulton et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0204823 A1* | 8/2009 | Giordano ............ G06F 11/3648 713/190 |
| 2009/0207660 A1 | 8/2009 | Hwang et al. |
| 2009/0213649 A1 | 8/2009 | Takahashi et al. |
| 2009/0222708 A1 | 9/2009 | Yamaga |
| 2009/0228761 A1 | 9/2009 | Perlmutter et al. |
| 2009/0235128 A1 | 9/2009 | Eun et al. |
| 2009/0249160 A1 | 10/2009 | Gao et al. |
| 2009/0251962 A1* | 10/2009 | Yun .................... G11C 16/3418 365/185.02 |
| 2009/0268521 A1 | 10/2009 | Ueno et al. |
| 2009/0292972 A1 | 11/2009 | Seol et al. |
| 2009/0296466 A1 | 12/2009 | Kim et al. |
| 2009/0296486 A1 | 12/2009 | Kim et al. |
| 2009/0310422 A1 | 12/2009 | Edahiro et al. |
| 2009/0319864 A1 | 12/2009 | Shrader |
| 2010/0002506 A1 | 1/2010 | Cho et al. |
| 2010/0008175 A1 | 1/2010 | Sweere et al. |
| 2010/0011261 A1 | 1/2010 | Cagno et al. |
| 2010/0020620 A1 | 1/2010 | Kim et al. |
| 2010/0037012 A1 | 2/2010 | Yano et al. |
| 2010/0054034 A1 | 3/2010 | Furuta et al. |
| 2010/0061151 A1 | 3/2010 | Miwa et al. |
| 2010/0091535 A1 | 4/2010 | Sommer et al. |
| 2010/0103737 A1 | 4/2010 | Park |
| 2010/0110798 A1 | 5/2010 | Hoei et al. |
| 2010/0115206 A1 | 5/2010 | de la Iglesia et al. |
| 2010/0118608 A1 | 5/2010 | Song et al. |
| 2010/0138592 A1 | 6/2010 | Cheon |
| 2010/0153616 A1 | 6/2010 | Garratt |
| 2010/0161936 A1 | 6/2010 | Royer et al. |
| 2010/0174959 A1 | 7/2010 | No et al. |
| 2010/0185807 A1 | 7/2010 | Meng et al. |
| 2010/0199027 A1 | 8/2010 | Pucheral et al. |
| 2010/0199125 A1 | 8/2010 | Reche |
| 2010/0199138 A1 | 8/2010 | Rho |
| 2010/0202196 A1 | 8/2010 | Lee et al. |
| 2010/0202239 A1* | 8/2010 | Moshayedi .............. G11C 5/04 365/229 |
| 2010/0208521 A1 | 8/2010 | Kim et al. |
| 2010/0257379 A1* | 10/2010 | Wang .................. G06F 1/3225 713/300 |
| 2010/0262889 A1 | 10/2010 | Bains |
| 2010/0281207 A1 | 11/2010 | Miller et al. |
| 2010/0281342 A1 | 11/2010 | Chang et al. |
| 2010/0306222 A1 | 12/2010 | Freedman et al. |
| 2010/0332858 A1 | 12/2010 | Trantham et al. |
| 2010/0332863 A1 | 12/2010 | Johnston |
| 2011/0010514 A1 | 1/2011 | Benhase et al. |
| 2011/0022779 A1 | 1/2011 | Lund et al. |
| 2011/0022819 A1 | 1/2011 | Post et al. |
| 2011/0051513 A1 | 3/2011 | Shen et al. |
| 2011/0066597 A1 | 3/2011 | Mashtizadeh et al. |
| 2011/0066806 A1 | 3/2011 | Chhugani et al. |
| 2011/0072207 A1 | 3/2011 | Jin et al. |
| 2011/0072302 A1 | 3/2011 | Sartore |
| 2011/0078407 A1 | 3/2011 | Lewis |
| 2011/0078496 A1 | 3/2011 | Jeddeloh |
| 2011/0083060 A1 | 4/2011 | Sakurada et al. |
| 2011/0099460 A1 | 4/2011 | Dusija et al. |
| 2011/0113281 A1 | 5/2011 | Zhang et al. |
| 2011/0122691 A1 | 5/2011 | Sprouse |
| 2011/0131444 A1 | 6/2011 | Buch et al. |
| 2011/0138260 A1 | 6/2011 | Savin |
| 2011/0173378 A1 | 7/2011 | Filor et al. |
| 2011/0179249 A1 | 7/2011 | Hsiao |
| 2011/0199825 A1 | 8/2011 | Han et al. |
| 2011/0205823 A1 | 8/2011 | Hemink et al. |
| 2011/0213920 A1 | 9/2011 | Frost et al. |
| 2011/0222342 A1 | 9/2011 | Yoon et al. |
| 2011/0225346 A1 | 9/2011 | Goss et al. |
| 2011/0225347 A1 | 9/2011 | Goss et al. |
| 2011/0228601 A1 | 9/2011 | Olbrich et al. |
| 2011/0231600 A1 | 9/2011 | Tanaka et al. |
| 2011/0239077 A1 | 9/2011 | Bai et al. |
| 2011/0264843 A1 | 10/2011 | Haines et al. |
| 2011/0271040 A1 | 11/2011 | Kamizono |
| 2011/0283119 A1 | 11/2011 | Szu et al. |
| 2011/0289125 A1 | 11/2011 | Guthery |
| 2011/0320733 A1 | 12/2011 | Sanford et al. |
| 2012/0011393 A1* | 1/2012 | Roberts ............... G06F 11/1417 714/6.3 |
| 2012/0017053 A1 | 1/2012 | Yang et al. |
| 2012/0023144 A1 | 1/2012 | Rub |
| 2012/0026799 A1 | 2/2012 | Lee |
| 2012/0054414 A1 | 3/2012 | Tsai et al. |
| 2012/0063234 A1 | 3/2012 | Shiga et al. |
| 2012/0072639 A1 | 3/2012 | Goss et al. |
| 2012/0096217 A1 | 4/2012 | Son et al. |
| 2012/0110250 A1 | 5/2012 | Sabbag et al. |
| 2012/0117317 A1 | 5/2012 | Sheffler |
| 2012/0117397 A1 | 5/2012 | Kolvick et al. |
| 2012/0124273 A1 | 5/2012 | Goss et al. |
| 2012/0131286 A1 | 5/2012 | Faith et al. |
| 2012/0151124 A1 | 6/2012 | Baek et al. |
| 2012/0151253 A1 | 6/2012 | Horn |
| 2012/0151294 A1 | 6/2012 | Yoo et al. |
| 2012/0173797 A1 | 7/2012 | Shen |
| 2012/0173826 A1* | 7/2012 | Takaku ............... G06F 11/1666 711/148 |
| 2012/0185750 A1 | 7/2012 | Hayami |
| 2012/0195126 A1 | 8/2012 | Roohparvar |
| 2012/0203804 A1 | 8/2012 | Burka et al. |
| 2012/0203951 A1 | 8/2012 | Wood et al. |
| 2012/0210095 A1 | 8/2012 | Nellans et al. |
| 2012/0216079 A1 | 8/2012 | Fai et al. |
| 2012/0233391 A1 | 9/2012 | Frost et al. |
| 2012/0236658 A1 | 9/2012 | Byom et al. |
| 2012/0239858 A1 | 9/2012 | Melik-Martirosian |
| 2012/0239868 A1 | 9/2012 | Ryan et al. |
| 2012/0239976 A1 | 9/2012 | Cometti et al. |
| 2012/0246204 A1 | 9/2012 | Nalla et al. |
| 2012/0259863 A1 | 10/2012 | Bodwin et al. |
| 2012/0275466 A1 | 11/2012 | Bhadra et al. |
| 2012/0278564 A1 | 11/2012 | Goss et al. |
| 2012/0284574 A1 | 11/2012 | Avila et al. |
| 2012/0284587 A1 | 11/2012 | Yu et al. |
| 2012/0297122 A1 | 11/2012 | Gorobets |
| 2013/0007073 A1 | 1/2013 | Varma |
| 2013/0007343 A1 | 1/2013 | Rub et al. |
| 2013/0007381 A1 | 1/2013 | Palmer |
| 2013/0007543 A1 | 1/2013 | Goss et al. |
| 2013/0024735 A1 | 1/2013 | Chung et al. |
| 2013/0031438 A1 | 1/2013 | Hu et al. |
| 2013/0036418 A1 | 2/2013 | Yadappanavar et al. |

(56) References Cited

U.S. PATENT DOCUMENTS

| | | |
|---|---|---|
| 2013/0038380 A1 | 2/2013 | Cordero et al. |
| 2013/0047045 A1 | 2/2013 | Hu et al. |
| 2013/0058145 A1 | 3/2013 | Yu et al. |
| 2013/0070527 A1 | 3/2013 | Sabbag et al. |
| 2013/0073784 A1 | 3/2013 | Ng et al. |
| 2013/0073798 A1 | 3/2013 | Kang et al. |
| 2013/0073924 A1 | 3/2013 | D'Abreu et al. |
| 2013/0079942 A1 | 3/2013 | Smola et al. |
| 2013/0086131 A1 | 4/2013 | Hunt et al. |
| 2013/0086132 A1 | 4/2013 | Hunt et al. |
| 2013/0094288 A1 | 4/2013 | Patapoutian et al. |
| 2013/0103978 A1 | 4/2013 | Akutsu |
| 2013/0110891 A1 | 5/2013 | Ogasawara et al. |
| 2013/0111279 A1 | 5/2013 | Jeon et al. |
| 2013/0111298 A1 | 5/2013 | Seroff et al. |
| 2013/0117606 A1* | 5/2013 | Anholt ............... G06F 11/1048 714/15 |
| 2013/0121084 A1 | 5/2013 | Jeon et al. |
| 2013/0124792 A1 | 5/2013 | Melik-Martirosian et al. |
| 2013/0124888 A1 | 5/2013 | Tanaka et al. |
| 2013/0128666 A1 | 5/2013 | Avila et al. |
| 2013/0132647 A1 | 5/2013 | Melik-Martirosian |
| 2013/0132652 A1 | 5/2013 | Wood et al. |
| 2013/0159609 A1 | 6/2013 | Haas et al. |
| 2013/0176784 A1 | 7/2013 | Cometti et al. |
| 2013/0179646 A1 | 7/2013 | Okubo et al. |
| 2013/0191601 A1 | 7/2013 | Peterson et al. |
| 2013/0194865 A1 | 8/2013 | Bandic et al. |
| 2013/0194874 A1 | 8/2013 | Mu et al. |
| 2013/0232289 A1 | 9/2013 | Zhong et al. |
| 2013/0238576 A1 | 9/2013 | Binkert et al. |
| 2013/0254498 A1 | 9/2013 | Adachi et al. |
| 2013/0254507 A1 | 9/2013 | Islam et al. |
| 2013/0258738 A1 | 10/2013 | Barkon et al. |
| 2013/0265838 A1 | 10/2013 | Li |
| 2013/0282955 A1 | 10/2013 | Parker et al. |
| 2013/0290611 A1 | 10/2013 | Biederman et al. |
| 2013/0297613 A1 | 11/2013 | Yu |
| 2013/0301373 A1 | 11/2013 | Tam |
| 2013/0304980 A1 | 11/2013 | Nachimuthu et al. |
| 2013/0314988 A1 | 11/2013 | Desireddi et al. |
| 2013/0343131 A1 | 12/2013 | Wu et al. |
| 2013/0346672 A1 | 12/2013 | Sengupta et al. |
| 2014/0013027 A1 | 1/2014 | Jannyavula Venkata et al. |
| 2014/0013188 A1 | 1/2014 | Wu et al. |
| 2014/0025864 A1 | 1/2014 | Zhang et al. |
| 2014/0032890 A1 | 1/2014 | Lee et al. |
| 2014/0063905 A1 | 3/2014 | Ahn et al. |
| 2014/0067761 A1 | 3/2014 | Chakrabarti et al. |
| 2014/0071761 A1 | 3/2014 | Sharon et al. |
| 2014/0075133 A1 | 3/2014 | Li et al. |
| 2014/0082261 A1 | 3/2014 | Cohen et al. |
| 2014/0082310 A1 | 3/2014 | Nakajima |
| 2014/0082456 A1 | 3/2014 | Li et al. |
| 2014/0082459 A1 | 3/2014 | Li et al. |
| 2014/0095775 A1 | 4/2014 | Talagala et al. |
| 2014/0101389 A1 | 4/2014 | Nellans et al. |
| 2014/0115238 A1 | 4/2014 | Xi et al. |
| 2014/0122818 A1 | 5/2014 | Hayasaka et al. |
| 2014/0122907 A1* | 5/2014 | Johnston ............... G11C 5/141 713/300 |
| 2014/0136762 A1 | 5/2014 | Li et al. |
| 2014/0136883 A1 | 5/2014 | Cohen |
| 2014/0136927 A1 | 5/2014 | Li et al. |
| 2014/0143505 A1 | 5/2014 | Sim et al. |
| 2014/0153333 A1 | 6/2014 | Avila et al. |
| 2014/0157065 A1 | 6/2014 | Ong |
| 2014/0173224 A1 | 6/2014 | Fleischer et al. |
| 2014/0181458 A1 | 6/2014 | Loh et al. |
| 2014/0201596 A1 | 7/2014 | Baum et al. |
| 2014/0223084 A1 | 8/2014 | Lee et al. |
| 2014/0244578 A1 | 8/2014 | Winkelstraeter |
| 2014/0258755 A1 | 9/2014 | Stenfort |
| 2014/0269090 A1 | 9/2014 | Flynn et al. |
| 2014/0279909 A1 | 9/2014 | Sudarsanam et al. |
| 2014/0310494 A1 | 10/2014 | Higgins et al. |
| 2014/0359044 A1* | 12/2014 | Davis ............... H04L 45/60 709/213 |
| 2014/0359381 A1 | 12/2014 | Takeuchi et al. |
| 2015/0023097 A1 | 1/2015 | Khoueir et al. |
| 2015/0032967 A1 | 1/2015 | Udayashankar et al. |
| 2015/0037624 A1 | 2/2015 | Thompson et al. |
| 2015/0153799 A1 | 6/2015 | Lucas et al. |
| 2015/0153802 A1 | 6/2015 | Lucas et al. |
| 2015/0212943 A1 | 7/2015 | Yang et al. |
| 2015/0268879 A1 | 9/2015 | Chu |
| 2015/0286438 A1 | 10/2015 | Simionescu et al. |

FOREIGN PATENT DOCUMENTS

| | | |
|---|---|---|
| EP | 1 990 921 A2 | 11/2008 |
| EP | 2 386 958 A1 | 11/2011 |
| EP | 2 620 946 A2 | 7/2013 |
| JP | 2002-532806 | 10/2002 |
| WO | WO 2007/036834 | 4/2007 |
| WO | WO 2007/080586 | 7/2007 |
| WO | WO 2008/075292 A2 | 6/2008 |
| WO | WO 2008/121553 | 10/2008 |
| WO | WO 2008/121577 | 10/2008 |
| WO | WO 2009/028281 | 3/2009 |
| WO | WO 2009/032945 | 3/2009 |
| WO | WO 2009/058140 | 5/2009 |
| WO | WO 2009/084724 | 7/2009 |
| WO | WO 2009/134576 | 11/2009 |
| WO | WO 2011/024015 | 3/2011 |

OTHER PUBLICATIONS

Gasior, "Gigabyte's i-Ram storage device RAM disk without the fuss", 2006, The Tech Report, 1-4.*
Ashkenazi et al., "Platform independent overall Security architecture in multi-processor system-on-chip integrated circuits for use in mobile phones and handheld devices," ScienceDirect, Computers and Electrical Engineering 33 (2007), 18 pages.
Invitation to Pay Additional Fees dated Feb. 13, 2015, received in International Patent Application No. PCT/US2014/063949, which corresponds to U.S. Appl. No. 14/135,433, 6 pages (Delpapa).
International Search Report and Written Opinion dated Mar. 9, 2015, received in International Patent Application No. PCT/US2014/059747, which corresponds to U.S. Appl. No. 14/137,440, 9 pages (Fitzpatrick).
International Search Report and Written Opinion dated Jan. 21, 2015, received in International Application No. PCT/US2014/059748, which corresponds to U.S. Appl. No. 14/137,511, 13 pages (Dancho).
International Search Report and Written Opinion dated Feb. 18, 2015, received in International Application No. PCT/US2014/066921, which corresponds to U.S. Appl. No. 14/135,260, 13 pages (Fitzpatrick).
Office Action dated Dec. 8, 2014, received in Chinese Patent Application No. 201180021660.2, which corresponds to U.S. Appl. No. 12/726,200, 7 pages. (Olbrich).
Office Action dated Jul. 31, 2015, received in Chinese Patent Application No. 201180021660.2, which corresponds to U.S. Appl. No. 12/726,200, 9 pages. (Olbrich).
International Search Report and Written Opinion dated Sep. 14, 2015, received in International Patent Application No. PCT/US2015/036807, which corresponds to U.S. Appl. No. 14/311,152, 9 pages. (Higgins).
Barr, "Introduction to Watchdog Timers," Oct. 2001, 3 pgs.
Canim, "Buffered Bloom Filters on Solid State Storage," ADMS*10, Singapore, Sep. 13-17, 2010, 8 pgs.
Kang, "A Multi-Channel Architecture for High-Performance NAND Flash-Based Storage System," J. Syst. Archit., vol. 53, Issue 9, Sep. 2007, 15 pgs.
Kim, "A Space-Efficient Flash Translation Layer for CompactFlash Systems," May 2002, IEEE vol. 48, No. 2, 10 pgs.
Lu, "A Forest-structured Bloom Filter with Flash Memory," MSST 2011, Denver, CO, May 23-27, 2011, article, 6 pgs.

(56) References Cited

OTHER PUBLICATIONS

Lu, "A Forest-structured Bloom Filter with Flash Memory," MSST 2011, Denver, CO, May 23-27, 2011, presentation slides, 25 pgs.
McLean, "Information Technology-AT Attachment with Packet Interface Extension," Aug. 19, 1998, 339 pgs.
Microchip Technology, "Section 10. Watchdog Timer and Power-Saving Modes," 2005. 14 pages.
Park et al., "A High Performance Controller for NAND Flash-Based Solid State Disk (NSSD)," Proceedings of Non-Volatile Semiconductor Memory Workshop. Feb. 2006. 4 pgs.
Zeidman, "Verilog Designer's Library," 1999, 9 pgs.
International Search Report and Written Opinion, dated Mar. 19, 2009 received in International Patent Application No. PCT/US08/88133, which corresponds to U.S. Appl. No. 12/082,202, 7 pgs (Prins)
International Search Report and Written Opinion, dated Mar. 19, 2009, received in International Patent Application No. PCT/US08/88136, which corresponds to U.S. Appl. No. 12/082,205, 7 pgs (Olbrich).
International Search Report and Written Opinion dated Feb. 26, 2009, received in International Patent Application No. PCT/US08/88146, which corresponds to U.S. Appl. No. 12/082,221, 10 pgs (Prins).
International Search Report and Written Opinion dated Feb. 27, 2009, received in International Patent Application No. PCT/US2008/088154, which corresponds to U.S. Appl. No. 12/082,207, 8 pgs (Prins).
International Search Report and Written Opinion dated Feb. 13, 2009, received in International Patent Application No. PCT/US08/88164, which corresponds to U.S. Appl. No. 12/082,220, 6 pgs (Olbrich).
International Search Report and Written Opinion dated Feb. 18, 2009, received in International Patent Application No. PCT/US08/88206, which corresponds to U.S. Appl. No. 12/082,206, 8 pgs (Prins).
International Search Report and Written Opinion dated Feb. 19, 2009, received in International Patent Application No. PCT/US08/88217, which corresponds to U.S. Appl. No. 12/082,204, 7 pgs (Olbrich).
International Search Report and Written Opinion dated Feb. 13, 2009, received in International Patent Application No. PCT/US08/88229, which corresponds to U.S. Appl. No. 12/082,223, 7 pgs (Olbrich).
International Search Report and Written Opinion dated Feb. 19, 2009, received in International Patent Application No. PCT/US08/88232, which corresponds to U.S. Appl. No. 12/082,222 8 pgs (Olbrich).
International Search Report and Written Opinion dated Feb. 19, 2009, received in International Patent Application No. PCT/US08/88236, which corresponds to U.S. Appl. No. 12/082,203, 7 pgs (Olbrich).
International Search Report and Written Opinion dated Oct. 27, 2011, received in International Patent Application. No. PCT/US2011/028637, which corresponds to U.S. Appl. No. 12/726,200, 11 pgs (Olbrich).
European Search Report dated Feb. 23, 2012, received in European Patent Application No. 08866997.3, which corresponds to U.S. Appl. No. 12/082,207, 6 pgs (Prins).
Office Action dated Apr. 18, 2012, received in Chinese Patent Application No. 200880127823.8, which corresponds to U.S. Appl. No. 12/082,207, 12 pgs (Prins).
Office Action dated Dec. 31, 2012, received in Chinese Patent Application No. 200880127623.8, which corresponds to U.S. Appl. No. 12/082,207, 9 pgs (Prins).
Notification of the Decision to Grant a Patent Right for Patent for Invention dated Jul. 4, 2013, received in Chinese Patent Application No. 200880127623.8, which corresponds to U.S. Appl. No. 12/082,207,1 pg (Prins).
Office Action dated Jul. 24, 2012, received in Japanese Patent Application No. JP 2010-540863, 3 pgs (Prins).

International Search Report and Written Opinion dated Mar. 7, 2014, received in International Patent Application No. PCT/US2013/074772, which corresponds to U.S. Appl. No. 13/831,218, 10 pages (George).
International Search Report and Written Opinion dated Mar. 24, 2014, received in International Patent Application No. PCT/US2013/074777, which corresponds to U.S. Appl. No. 13/831,308, 10 pages (George).
International Search Report and Written Opinion dated Mar. 7, 2014, received in International Patent Application No. PCT/US2013/074779, which corresponds to U.S. Appl. No. 13/831,374, 8 pages (George).
International Search Report and Written Opinion dated Aug. 31, 2012, received in International Patent Application PCT/US2012/042764, which corresponds to U.S. Appl. No. 13/285,873,12 pgs (Frayer).
International Search Report and Written Opinion dated Mar. 4, 2013, received in PCT/US2012/042771, which corresponds to U.S. Appl. No. 13/286,012, 14 pgs (Stonelake).
International Search Report and Written Opinion dated Sep. 26, 2012, received in International Patent Application No. PCT/US2012/042775, which corresponds to U.S. Appl. No. 13/285,892, 8 pgs (Weston-Lewis et al.)
International Search Report and Written Opinion dated Jun. 6, 2013, received in International Patent Application No. PCT/US2012/059447, which corresponds to U.S. Appl. No. 13/602,031, 12 pgs (Tai).
International Search Report and Written Opinion dated Jun. 6, 2013, received in International Patent Application No. PCT/US2012/059453, which corresponds to U.S. Appl. No. 13/602,039, 12 pgs (Frayer).
International Search Report and Written Opinion dated Feb. 14, 2013, received in International Patent Application No. PCT/US2012/059459, which corresponds to U.S. Appl. No. 13/602,047, 9 pgs (Tai).
International Search Report and Written Opinion dated May 23, 2013, received in International Patent Application No. PCT/US2012/065914, which corresponds to U.S. Appl. No. 13/679,963, 7 pgs (Frayer).
International Search Report and Written Opinion dated Apr. 5, 2013, received in International Patent Application No. PCT/US2012/065916, which corresponds to U.S. Appl. No. 13/679,969, 7 pgs (Frayer).
International Search Report and Written Opinion dated Jun. 17, 2013, received in International Patent Application No. PCT/US2012/065919, which corresponds to U.S. Appl. No. 13/679,970, 8 pgs (Frayer).
International Search Report and Written Opinion dated Jul. 25, 2014, received in International Patent Application No. PCT/US2014/029453, which corresponds to U.S. Appl. No. 13/963,444, 9 pages (Frayer).
Bayer, "Prefix B-Trees", IP.com Journal, IP.com Inc., West Henrietta, NY, Mar. 30, 2007, 29 pages.
Bhattacharjee et al., "Efficient Index Compression in DB2 LUW", IBM Research Report, Jun. 23, 2009, http://domino.research.ibm.com/library/cyberdig.nsf/papers/40B2C45876D0D747852575E100620CE7/$File/rc24815.pdf, 13 pages.
Lee et al., "A Semi-Preemptive Garbage Collector for Solid State Drives," Apr. 2011, IEEE, pp. 12-21.
Oracle, "Oracle9i: Database Concepts", Jul. 2001, http://docs.oracle.com/cd/A91202_01/901_doc/server.901/a88856.pdf, 49 pages.
Office Action dated Feb. 17, 2015, received in Chinese Patent Application No. 201210334987.1, which corresponds to U.S. Appl. No. 12/082,207, 9 pages (Prins).
International Search Report and Written Opinion dated May 4, 2015, received in International Patent Application No. PCT/US2014/065987, which corresponds to U.S. Appl. No. 14/135,400, 12 pages (George).

(56) References Cited

OTHER PUBLICATIONS

International Search Report and Written Opinion dated Mar. 17, 2015, received in International Patent Application No. PCT/US2014/067467, which corresponds to U.S. Appl. No. 14/135,420, 13 pages (Lucas).
International Search Report and Written Opinion dated Apr. 20, 2015, received in International Patent Application No. PCT/US2014/063949, which corresponds to U.S. Appl. No. 14/135,433, 21 pages (Delpapa).
International Search Report and Written Opinion dated Jun. 8, 2015, received in International Patent Application No. PCT/US2015/018252, which corresponds to U.S. Appl. No. 14/339,072, 9 pages (Busch).
International Search Report and Written Opinion dated Jun. 2, 2015, received in International Patent Application No. PCT/US2015/018255, which corresponds to U.S. Appl. No. 14/336,967, 14 pages (Chander).
International Search Report and Written Opinion dated Jun. 30, 2015, received in International Patent Application No. PCT/US2015/023927, which corresponds to U.S. Appl. No. 14/454,687, 11 pages (Kadayam).
International Search Report and Written Opinion dated Jul. 23, 2015, received in International Patent Application No. PCT/US2015/030850, which corresponds to U.S. Appl. No. 14/298,843, 12 pages (Ellis).
Gasior, "Gigabyte's i-Ram storage device, Ram disk without the fuss," The Tech Report, p. 1, Jan. 25, 2006, 5 pages.
IBM Research-Zurich, "The Fundamental Limit of Flash Random Write Performance: Understanding, Analysis and Performance Modeling," Mar. 31, 2010, pp. 1-15.
Oestreicher et al., "Object Lifetimes in Java Card," 1999, USENIX, 10 pages.
International Preliminary Report on Patentability dated May 24, 2016, received in International Patent Application No. PCT/US2014/065987, which corresponds to U.S. Appl. No. 14/135,400, 9 pages (George).
Office Action dated Apr. 25, 2016, received in Chinese Patent Application No. 201280066282.4, which corresponds to U.S. Appl. No. 13/602,047, 8 pages (Tai).
International Preliminary Report on Patentability dated Dec. 6, 2016, received in International Patent Application No. PCT/US2015/030850, which corresponds to U.S. Appl. No. 14/298,843, 8 pages (Ellis).
International Preliminary Report on Patentability dated Dec. 20, 2016, received in International Patent Application No. PCT/US2015/036807, which corresponds to U.S. Appl. No. 14/311,152, 6 pages (Higgins).
Office Action dated Jan. 11, 2017, received in Chinese Patent Application No. 201280066282.4, which corresponds to U.S. Appl. No. 13/602,047, 3 pages (Tai).

\* cited by examiner

In response to the reversion trigger, initiate recovery actions for each controller in the set of one or more controllers, including: for each controller in the set of one or more controllers: (1) asserting a revert signal to the controller to execute a firmware reversion for the controller, and (2) resetting the controller subsequent to asserting the revert signal to the controller ⎯404

(B)

Initiating recovery actions further includes, with respect to a controller in the set of one or more controllers: prior to resetting the controller, performing a power fail operation for the controller, the power fail operation including: (1) signaling a power fail condition to the controller; and (2) transferring data held in volatile memory to non-volatile memory ⎯422

The non-volatile memory comprises one or more flash memory devices ⎯424

With respect to a controller in the set of one or more controllers, the revert signal is a dedicated general purpose I/O (GPIO) signal associated with the controller ⎯426

With respect to a controller in the set of one or more controllers, the revert signal is asserted using an out-of-band signaling technique ⎯428

A controller of the set of one or more controllers is a non-volatile memory (NVM) controller, and the revert signal is a universal asynchronous receiver/transmitter (UART) transmit signal ⎯430

For each controller of the set of one or more controllers, prior to executing the firmware reversion for the controller, the controller uses a first version of firmware, and subsequent to executing the firmware reversion for the controller, the controller uses a second version of firmware ⎯432

The second version of firmware is an earlier version of firmware than the first version of firmware ⎯434

Figure 4C

FIRMWARE REVERSION TRIGGER AND CONTROL

RELATED APPLICATION

This application claims priority to U.S. Provisional Patent Application Ser. No. 61/946,729, filed Mar. 1, 2014, entitled "Firmware Reversion Trigger and Control," which is hereby incorporated by reference in its entirety.

TECHNICAL FIELD

The disclosed embodiments relate generally to memory systems, and in particular, to firmware reversion triggering and control in a storage device.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information.

Some storage devices (e.g., memory devices) with multi-controller topologies (e.g., with multiple programmable processing units) have different firmware for each of the different controller types. Since it is common for a controller to have a fault condition that renders it inoperable, recovery management (e.g., using firmware reversion) of inoperable controllers is important.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable firmware reversion triggering and control in a storage device. In one aspect, a reversion trigger is detected and in response to the reversion trigger, recovery actions for one or more controllers are initiated.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIGS. 4A-4C illustrate a flowchart representation of a method of recovery in a storage device, in accordance with some embodiments.

Figure 1A:
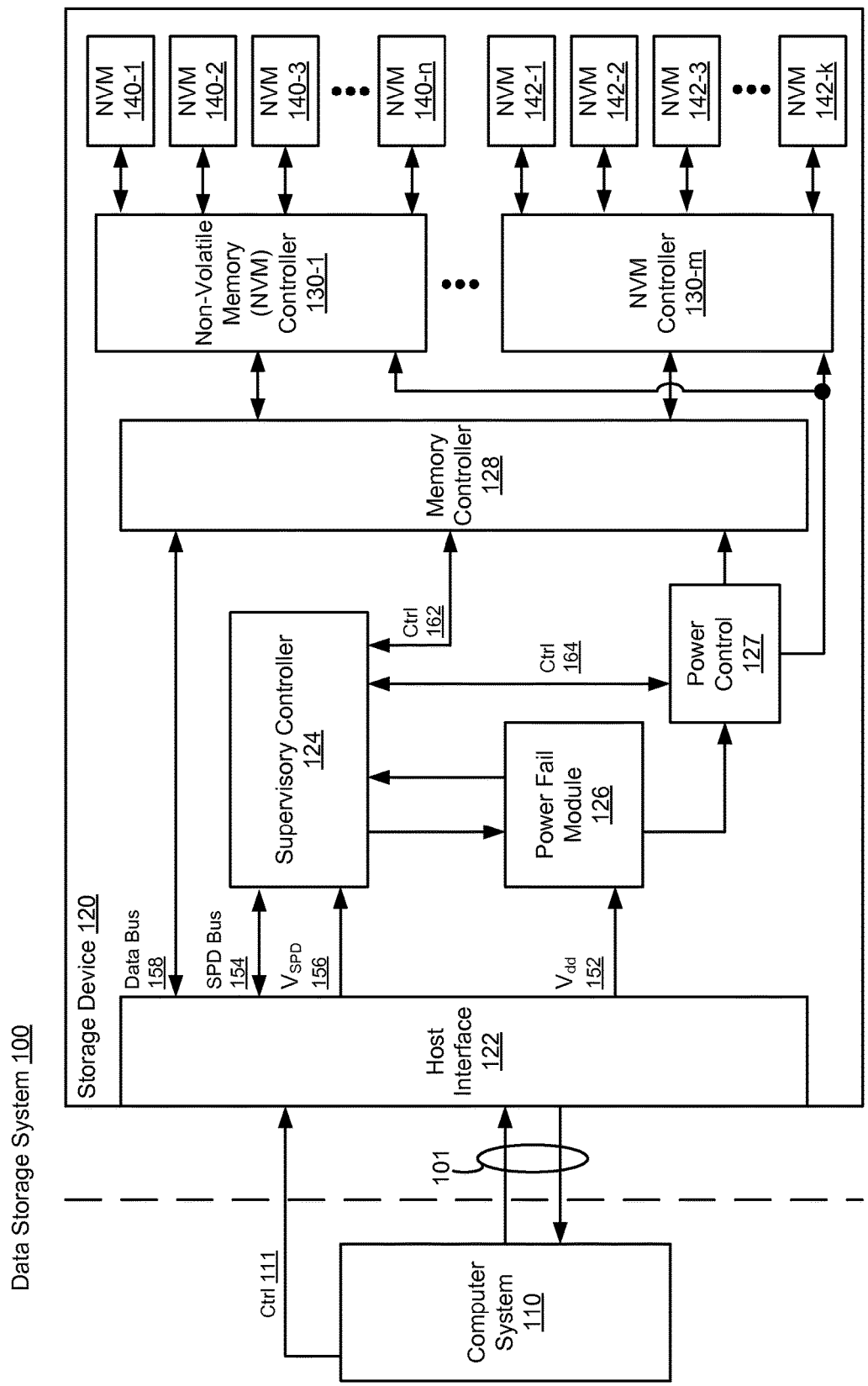
FIG. 1A is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices for firmware reversion triggering and control in a storage device. Some implementations include systems, methods and/or devices to detect a reversion trigger and in response to the reversion trigger, initiate recovery actions for one or more controllers of the storage device.

More specifically, some embodiments include a method of recovery in a storage device. In some embodiments, the method includes: (1) detecting a reversion trigger, the reversion trigger identifying a set of one or more controllers of a plurality of controllers on the storage device, and (2) in response to the reversion trigger, initiating recovery actions for each controller in the set of one or more controllers, including: for each controller in the set of one or more controllers: (a) asserting a revert signal to the controller to execute a firmware reversion for the controller, and (b) resetting the controller subsequent to asserting the revert signal to the controller.

In some embodiments, initiating recovery actions further includes, with respect to a controller in the set of one or more controllers, prior to resetting the controller, performing a power fail operation for the controller, the power fail operation including: (1) signaling a power fail condition to the controller, and (2) transferring data held in volatile memory to non-volatile memory.

In some embodiments, the non-volatile memory comprises one or more flash memory devices.

In some embodiments, the non-volatile memory comprises one or more three-dimensional (3D) memory devices.

In some embodiments, the reversion trigger is generated internally in the storage device when predefined criteria are satisfied, the predefined criteria including detection that one or more controllers of the plurality of controllers on the storage device are not operational.

In some embodiments, the reversion trigger is received through one or more debug ports associated with the storage device.

In some embodiments, the reversion trigger includes a reversion command from a host system.

In some embodiments, with respect to a controller in the set of one or more controllers, the revert signal is a dedicated general purpose I/O (GPIO) signal associated with the controller.

In some embodiments, with respect to a controller in the set of one or more controllers, the revert signal is asserted using an out-of-band signaling technique.

In some embodiments, a controller of the set of one or more controllers is a non-volatile memory (NVM) controller, and the revert signal is a universal asynchronous receiver/transmitter (UART) transmit signal.

In some embodiments, for each controller of the set of one or more controllers, prior to executing the firmware reversion for the controller, the controller uses a first version of firmware, and subsequent to executing the firmware reversion for the controller, the controller uses a second version of firmware.

In some embodiments, the second version of firmware is an earlier version of firmware than the first version of firmware.

In some embodiments, the method further includes, with respect to a controller in the set of one or more controllers, subsequent to resetting the controller, installing a new version of firmware.

In some embodiments, the storage device includes a dual in-line memory module (DIMM) device.

In some embodiments, the plurality of controllers on the storage device include a memory controller and one or more flash controllers, the one or more flash controllers coupled by the memory controller to a host interface of the storage device.

In some embodiments, the plurality of controllers on the storage device includes at least one non-volatile memory controller and at least one other memory controller other than the at least one non-volatile memory controller.

In some embodiments, one of the plurality of controllers on the memory device maps double data rate (DDR) interface commands to serial advance technology attachment (SATA) interface commands.

In some embodiments, the storage device comprises one or more three-dimensional (3D) memory devices.

In another aspect, any of the methods described above are performed by a storage device including an interface for operatively coupling the storage device with a host system. In some embodiments, the storage device is configured to (1) detect a reversion trigger, the reversion trigger identifying a set of one or more controllers of a plurality of controllers on the storage device, and (2) in response to the reversion trigger, initiate recovery actions for each controller in the set of one or more controllers, including: for each controller in the set of one or more controllers: (a) asserting a revert signal to the controller to execute a firmware reversion for the controller, and (b) resetting the controller subsequent to asserting the revert signal to the controller. In some embodiments, the storage device is configured to perform any of the methods described herein.

In some embodiments, the storage device includes a supervisory controller with one or more processors and memory. In some embodiments, the storage device includes a plurality of controllers.

In yet another aspect, any of the methods described above are performed by a storage device including an interface for operatively coupling the storage device with a host system and means for performing any of the methods described herein.

In yet another aspect, some embodiments include a non-transitory computer readable storage medium, storing one or more programs for execution by one or more processors of a storage device, the one or more programs including instructions for performing any of the methods described herein.

In some embodiments, the storage device includes a plurality of controllers and a supervisory controller, and the non-transitory computer readable storage medium includes a non-transitory computer readable storage medium associated with each of the plurality of controllers on the storage device and a non-transitory computer readable storage medium associated with the supervisory controller.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1A is a block diagram illustrating an implementation of a data storage system 100, in accordance with some embodiments. While some example features are illustrated, various other features have not been illustrated for the sake of brevity and so as not to obscure more pertinent aspects of the example implementations disclosed herein. To that end, as a non-limiting example, data storage system 100 includes storage device 120, which includes host interface 122, supervisory controller 124, power fail module 126, power control 127, memory controller 128, one or more non-volatile memory (NVM) controllers 130 (e.g., NVM controller 130-1 through NVM controller 130-m), and non-volatile memory (NVM) (e.g., one or more NVM device(s) 140, 142 such as one or more flash memory devices), and is used in conjunction with computer system 110.

Computer system 110 is coupled with storage device 120 through data connections 101. However, in some embodiments, computer system 110 includes storage device 120 as a component and/or sub-system. Computer system 110 may be any suitable computing device, such as a personal computer, a workstation, a computer server, or any other computing device. Computer system 110 is sometimes called a host or host system. In some embodiments, computer system 110 includes one or more processors, one or more types of memory, optionally includes a display and/or other user interface components such as a keyboard, a touch screen display, a mouse, a track-pad, a digital camera and/or any number of supplemental devices to add functionality. Further, in some embodiments, computer system 110 sends one or more host commands (e.g., read commands and/or write commands) on control line 111 to storage device 120. In some embodiments, computer system 110 is a server system, such as a server system in a data center, and does not have a display and other user interface components.

In some embodiments, storage device 120 includes a single NVM device (e.g., a single flash memory device) while in other embodiments storage device 120 includes a plurality of NVM devices (e.g., a plurality of flash memory devices). In some embodiments, NVM devices 140, 142 include NAND-type flash memory or NOR-type flash memory. Further, in some embodiments, NVM controller 130 is a solid-state drive (SSD) controller. However, one or more other types of storage media may be included in accordance with aspects of a wide variety of implementations. In some embodiments, storage device 120 is or includes a dual in-line memory module (DIMM) device. In some embodiments, storage device 120 is compatible with a DIMM memory slot. For example, in some embodiments, storage device 120 is compatible with a 240-pin DIMM memory slot and is compatible with signaling in accordance with a DDR3interface specification.

In some embodiments, storage device 120 includes NVM devices 140, 142 (e.g., NVM devices 140-1 through 140-n and NVM devices 142-1 through 142-k) and NVM controllers 130 (e.g., NVM controllers 130-1 through 130-m). In some embodiments, each NVM controller of NVM controllers 130 includes one or more processing units (sometimes called CPUs or processors or microprocessors or microcontrollers) configured to execute instructions in one or more programs (e.g., in NVM controllers 130). NVM devices 140, 142 are coupled with NVM controllers 130 through connections that typically convey commands in addition to data, and, optionally, convey metadata, error correction information and/or other information in addition to data values to be stored in NVM devices 140, 142 and data values read from NVM devices 140, 142. For example, NVM devices 140, 142 can be configured for enterprise storage suitable for applications such as cloud computing, or for caching data stored (or to be stored) in secondary storage, such as hard disk drives. Additionally and/or alternatively, flash memory (e.g., NVM devices 140, 142) can also be configured for relatively smaller-scale applications such as personal flash drives or hard-disk replacements for personal, laptop and tablet computers. Although flash memory devices and flash controllers are used as an example here, in some embodiments storage device 120 includes other non-volatile memory device(s) and corresponding non-volatile memory controller(s). In some embodiments, storage device 120 includes one or more three-dimensional (3D) memory devices, as further defined herein.

In some embodiments, storage device 120 also includes host interface 122, supervisory controller 124, power fail module 126, power control 127, and memory controller 128, or a superset or subset thereof. Storage device 120 may include various additional features that have not been illustrated for the sake of brevity and so as not to obscure more pertinent features of the example implementations disclosed herein, and a different arrangement of features may be possible. Host interface 122 provides an interface to computer system 110 through data connections 101.

In some embodiments, supervisory controller 124 includes one or more processing units (also sometimes called CPUs or processors or microprocessors or microcontrollers) configured to execute instructions in one or more programs (e.g., in supervisory controller 124). Supervisory controller 124 is typically coupled with host interface 122, power fail module 126, power control 127, memory controller 128, and NVM controllers 130 (connection not shown) in order to coordinate the operation of these components, including supervising and controlling functions such as power up, power down, data hardening, charging energy storage device(s), data logging, firmware reversion, and other aspects of managing functions on storage device 120. Supervisory controller 124 is coupled with host interface 122 via serial presence detect (SPD) bus 154 and receives supply voltage line $V_{SPD}$ 156 from the host interface 122. $V_{SPD}$ 156 is typically a standardized voltage (e.g., 3.3 volts). Serial presence detect (SPD) refers to a standardized way to automatically access information about a computer memory module (e.g., storage device 120). In some embodiments, supervisory controller 124 includes circuitry configured to monitor an input voltage (e.g., $V_{SPD}$ 156). In some embodiments, if the memory module has a failure, the failure can be communicated with a host system (e.g., computer system 110) via SPD bus 154.

Power fail module 126 is typically coupled with host interface 122, supervisory controller 124, and power control 127. Power fail module 126 is configured to monitor one or more input voltages (e.g., $V_{dd}$ 152 and, optionally, $V_{SPD}$ 156 if provided to power fail module 126) provided to storage device 120 by a host system (e.g., computer system 110). In response to detecting a power fail condition (e.g., an under or over voltage event) of an input voltage, power fail module 126 is configured to provide a $V_{dd}$ PFAIL signal to supervisory controller 124. In some embodiments, in response to detecting the power fail condition, power fail module 126 also discharges an energy storage device to provide power to memory controller 128 and NVM controllers 130. Power fail module 126 is described in further detail below with respect to FIG. 3. In response to receiving a PFAIL signal indicating a power fail condition (e.g., a $V_{dd}$ PFAIL signal from power fail module 126 or a $V_{SPD}$ PFAIL from voltage monitoring circuitry within supervisory controller 124), supervisory controller 124 performs one or more operations of a power fail process including, but not limited to, signaling the power fail condition to a plurality of controllers on storage device 120 (e.g., memory controller 128 and NVM controllers 130) via control lines 162 (connection to NVM controllers 130 not shown).

Power control 127 is typically coupled with supervisory controller 124, power fail module 126, memory controller 128, and NVM controllers 130 in order to provide power to these components. In some embodiments, power control 127 includes one or more voltage regulators controlled by supervisory controller 124 via control line 164. Furthermore, in some embodiments, power control 127 is configured to remove power from a specified NVM controller 130 in response to a command from supervisory controller 124 via control line 164.

Memory controller 128 is typically coupled with host interface 122, supervisory controller 124, power control 127, and NVM controllers 130. In some embodiments, during a write operation, memory controller 128 receives data via data bus 158 from computer system 110 through host interface 122 and during a read operation, memory controller 128 sends data to computer system 110 through host interface 122 via data bus 158. Further, host interface 122 provides additional data, signals, voltages, and/or other information needed for communication between memory controller 128 and computer system 110. In some embodiments, memory controller 128 and host interface 122 use a defined interface standard for communication, such as double data rate type three synchronous dynamic random access memory (DDR3). In some embodiments, memory controller 128 and NVM controllers 130 use a defined interface standard for communication, such as serial advance technology attachment (SATA). In some other embodiments, the device interface used by memory controller 128 to communicate with NVM controllers 130 is SAS (serial attached SCSI), or other storage interface. In some embodiments, memory controller 128 maps DDR interface commands from the host system (e.g., computer system 1120) to SATA or SAS interface commands for the plurality of controllers (e.g., memory controller 128 and NVM controllers 130). In some embodiments, memory controller 128 includes one or more processing units (also sometimes called CPUs or processors or microprocessors or microcontrollers) configured to execute instructions in one or more programs (e.g., in memory controller 128).

Figure 1B:
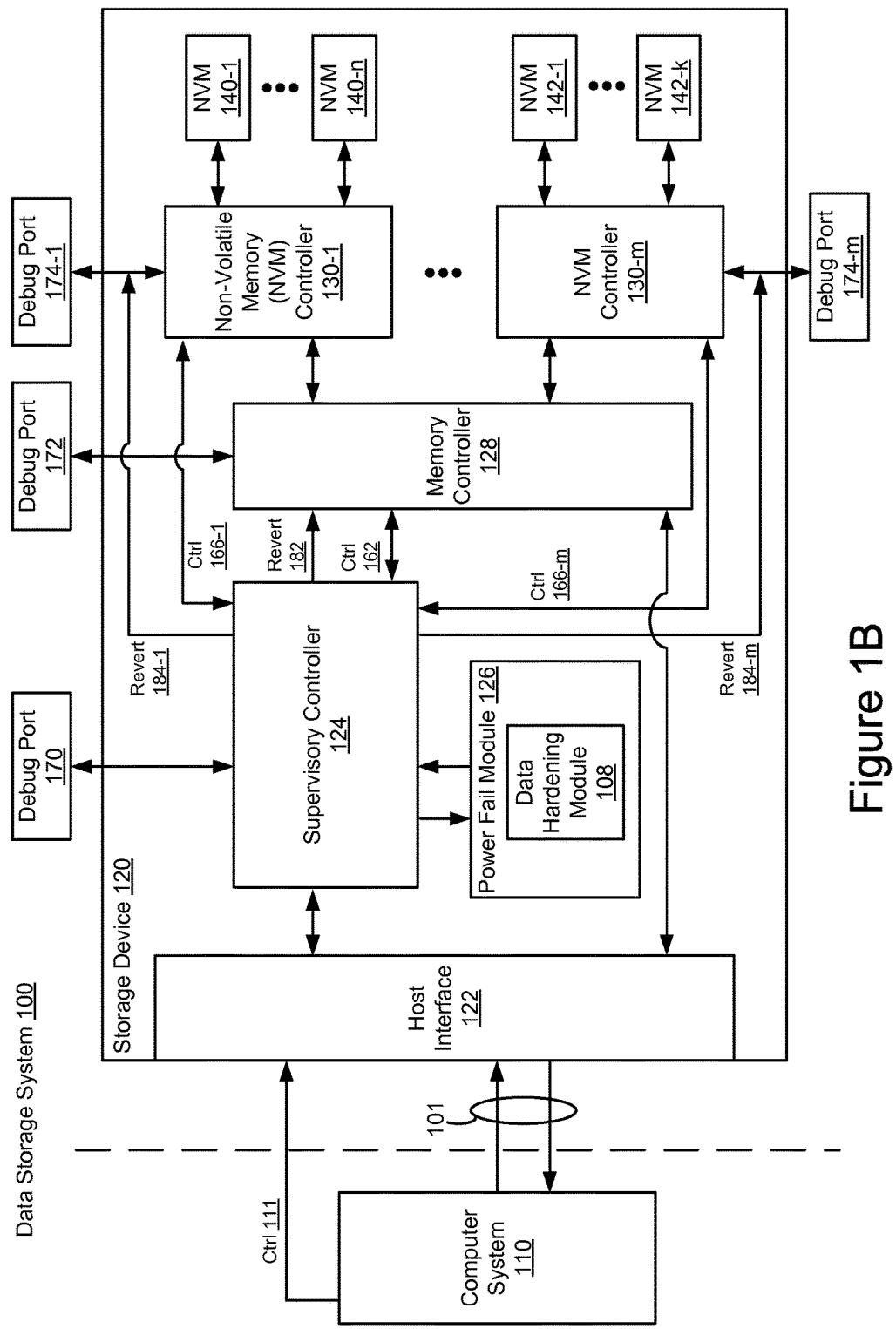
FIG. 1B is a block diagram illustrating an implementation of a data storage system, in accordance with some embodiments.

FIG. 1B is a block diagram illustrating an implementation of a data storage system 100, in accordance with some embodiments. While some example features are illustrated, various other features have not been illustrated for the sake of brevity and so as not to obscure more pertinent aspects of the example implementations disclosed herein. To that end, as a non-limiting example, data storage system 100 includes storage device 120, which includes host interface 122, supervisory controller 124, power fail module 126, memory controller 128, one or more non-volatile memory (NVM) controllers 130 (e.g., NVM controller 130-1 through NVM controller 130-m), and non-volatile memory (NVM) (e.g., one or more NVM device(s) 140, 142 such as one or more flash memory devices), and is used in conjunction with computer system 110, as described above with respect to FIG. 1A. For the sake of brevity, descriptions of elements having the same reference numerals in FIG. 1A are not repeated here.

In some embodiments, each of the different controllers in storage device 120 has different firmware. For example, in some embodiments, memory controller 128 has one firmware load and NVM controller 130 has another firmware load. If the firmware for a single controller becomes corrupted or hangs, the entire storage device may be rendered useless. It is common for a controller to have a fault condition that renders it inoperable (sometimes called hung) and in a state in which it can no longer execute instructions. In some embodiments, a method to recover one or more hung controllers includes firmware reversion. For example, if a firmware version is causing a controller to hang, it is desired to revert to an original production level firmware (e.g., an original factory version of the firmware) or revert to an earlier valid version of the firmware. For ease of explanation, the examples below refer to firmware reversion as reverting to an original production level firmware; however, it should be noted that in some embodiments, firmware reversion includes reverting to another pre-existing version of firmware (e.g., an earlier valid version of the firmware).

Typical approaches to firmware reversion include physically shorting two electrical points for a given controller, which requires the factory or the customer to have access to these points on a circuit board. However, this physical method requires manual intervention and in most cases, would require the storage device to be disassembled in order to gain access to the electrical points. Further, in the case where multiple storage devices require firmware reversion (e.g., 500 storage devices in a tester during production), a physical method of firmware reversion is not feasible. Unlike the physical method of firmware reversion, the embodiments described herein present a method of recovery that does not require disassembling the storage device or manually shorting two electrical points on the circuit board of the storage device.

In some embodiments, debug ports 170, 172, 174 are used to communicate a reversion trigger to storage device 120, the reversion trigger identifying a set of one or more controllers (e.g., supervisory controller 124, memory controller 128, and/or NVM controllers 130) to recover (e.g., by executing a firmware reversion). In some embodiments, debug ports 170, 172, 174 provide debug access to supervisory controller 124, memory controller 128, and NVM controllers 130, respectively. In some embodiments, debug ports 170, 172, 174 are externalized via a debug connector and are accessible to a user (e.g., a Field Application Engineer). In some embodiments, a user determines which controller(s) are hung and communicates a reversion trigger via a debug port. In some embodiments, one or more debug port connections are connected through a switch to allow for fewer debug connectors on storage device 120.

In some embodiments, the reversion trigger is generated internally in storage device 120 when predefined criteria are satisfied, the predefined criteria including detection that one or more controllers on storage device 120 are not operational. For example, in some embodiments, supervisory controller 124 monitors the operational state of the controllers on storage device 120 (e.g., memory controller 128 and/or NVM controllers 130), and if an improper state is detected, supervisory controller 124 determines which controller is non-operational (e.g., hung) and generates a reversion trigger for the non-operational controller. In some embodiments, supervisory controller 124 determines that one or more controllers (e.g., one, several, or all of the controllers on storage device 120) are non-operational and determines the appropriate set of one or more controllers to recover and generates a reversion trigger. In some embodiments, the reversion trigger is a single reversion trigger identifying the set of one or more controllers to recover. In some embodiments, the reversion trigger is a set of one or more reversion triggers, each identifying one or more controllers to recover, respectively.

In some embodiments, the reversion trigger is a reversion command from a host system (e.g., computer system 110). In some embodiments, the reversion command from the host system is sent to storage device 120 if the host system determines the storage device is non-operational. In some embodiments, the reversion command from the host system specifies which controller(s) of the plurality of controllers on the storage device are not operational. In some embodiments, the reversion command from the host system is communicated over a system management bus (SMBus) (e.g., SPD Bus 154, FIG. 1A).

In some embodiments, in response to a reversion trigger, supervisory controller 124 signals to memory controller 128 and/or NVM controllers 130 to execute a firmware reversion. For example, in some embodiments, in response to a reversion trigger identifying memory controller 128, supervisory controller 124 asserts revert signal 182 to memory controller 128 to execute a firmware reversion. In some embodiments, revert signal 182 is a dedicated general purpose I/O (GPIO) signal. In some embodiments, asserting the revert signal includes changing the revert signal to logically true. For example, in some embodiments, revert signal 182 is normally high (e.g., logically false), but if this signal is asserted low (e.g., logically true) during power up, memory controller 128 will revert to running from its original production level code. In some embodiments, supervisory controller 124 asserts revert signal 182 when it determines that memory controller 128 requires recovering (e.g., in response to a reversion trigger).

As another example, in some embodiments, in response to a reversion trigger identifying NVM controller 130-1, supervisory controller 124 asserts revert signal 184-1 to NVM controller 130-1 to execute a firmware reversion. In some embodiments, each NVM controller (e.g., NVM controller 130-1 through NVM controller 130-m) has a universal asynchronous receiver/transmitter (UART) port that is externalized via a debug connector for serial port debugging. In some embodiments, to recover a non-operational (e.g., hung) NVM controller, its UART transmit (Tx) pin is pulled to ground. In some embodiments, revert signal 184-1 is connected to the UART Tx pin for NVM controller 130-1 and supervisory controller 124 can force the Tx signal to ground by pulling revert signal 184-1 to ground. In some embodiments, if revert signal 184-1 is asserted low (e.g., logically true) during power up, NVM controller 130-1 will revert to running from its original production level code. In some embodiments, supervisory controller 124 asserts revert signal 184-1 when it determines that NVM controller 130-1 requires recovering (e.g., in response to a reversion trigger).

Further, the description of revert signal 184-1 similarly applies to the revert signal for other NVM controllers (e.g., NVM controllers 130-2 through 130-m) in storage device 120. For example, in some embodiments, in response to a reversion trigger identifying NVM controller 130-m, supervisory controller 124 asserts revert signal 184-m to NVM controller 130-m to execute a firmware reversion.

In some embodiments, at least two different types of controllers (e.g., NVM controllers 130 and memory controller 128) on storage device 120 have different reversion triggers. In some embodiments, for example, the different reversion triggers include two or more of: a GPIO reversion trigger where the trigger signal is edge sensitive, a GPIO reversion trigger where the trigger signal is level sensitive, a GPIO reversion trigger where the trigger signal is sensitive to a pulse of a predetermined magnitude and duration, a non-maskable interrupt (NMI), and a command based trigger (e.g., a UART port command or an I2C command). In some embodiments, the hang condition and sequencing is different for different types of controllers (e.g., the hang condition for memory controller 128 is different from the hang condition for NVM controller 130-1), which is accounted for in supervisory controller 124. Alternatively, in some embodiments, the actions required for firmware reversions of the various controllers on storage device 120 are handled by a dedicated section of hardware that does not rely on firmware (e.g., so that a firmware reversion method is available that itself does not depend on updated firmware).

In some embodiments, data hardening module 108 is configured to interconnect an energy storage device to provide power to memory controller 128 and NVM controllers 130. In some embodiments, prior to resetting a controller as part of firmware reversion, a power fail operation is executed for the controller, which transfers data held in volatile memory to non-volatile memory. This ensures that metadata is secured before the controller is reset. In some embodiments, a reversion trigger that initiates recovery actions for a controller (e.g., firmware reversion) also triggers a power fail condition. Data hardening module 108 is described in further detail below with respect to FIG. 3. For further description of data hardening module 108, see U.S. Provisional Patent Application Ser. No. 61/887,910, filed Oct. 7, 2013, entitled "Power Sequencing and Data Hardening Circuitry Architecture," which is incorporated by reference herein in its entirety.

Figure 2A:
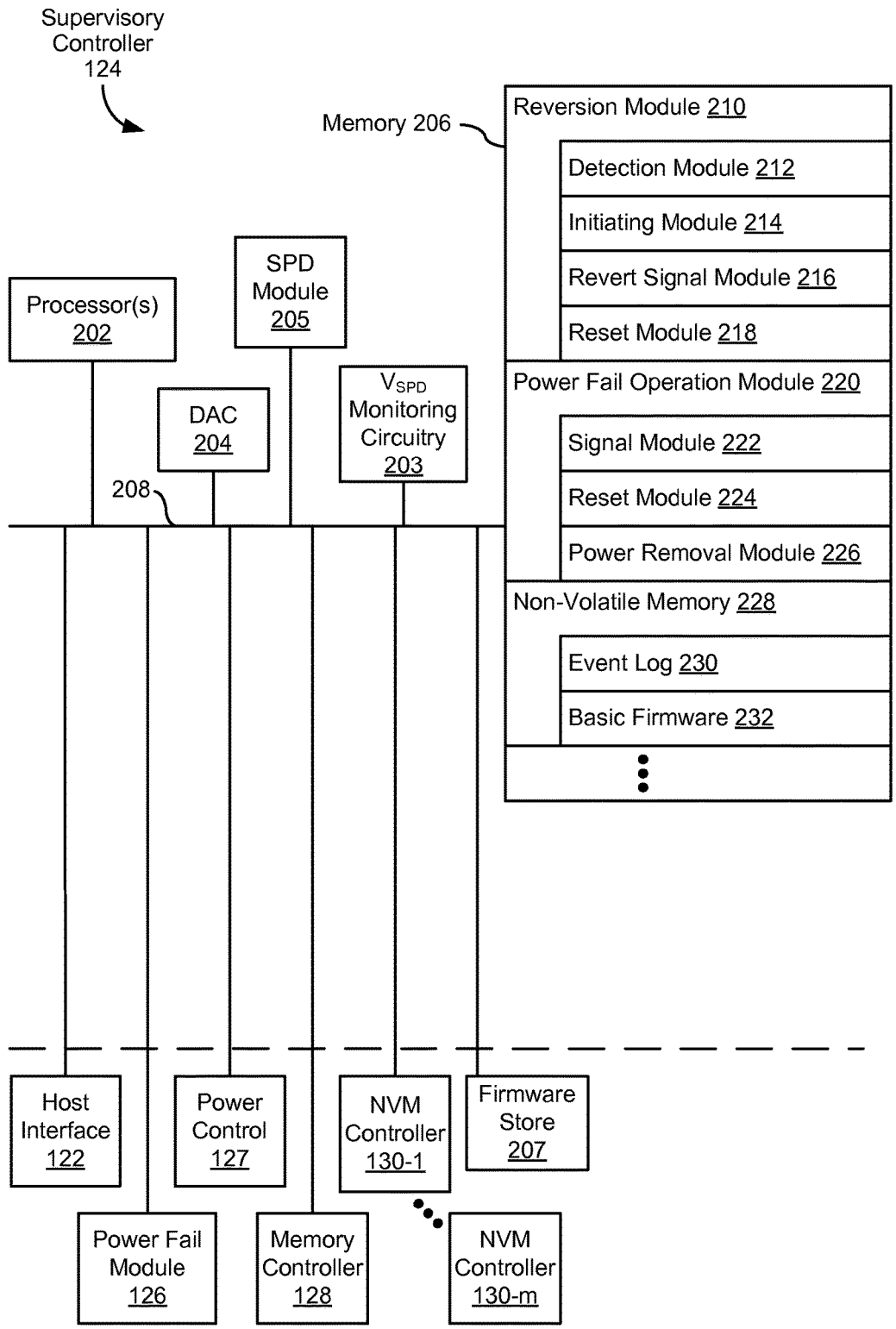
FIG. 2A is a block diagram illustrating an implementation of a supervisory controller, in accordance with some embodiments.

FIG. 2A is a block diagram illustrating an implementation of supervisory controller 124 in accordance with some embodiments. Supervisory controller 124 includes one or more processors 202 (sometimes called CPUs or processing units or microprocessors or microcontrollers) for executing modules, programs and/or instructions stored in memory 206 and thereby performing processing operations, serial presence detect (SPD) module 205 (e.g., non-volatile memory) storing information related to storage device 120 (e.g., a serial number, memory type, supported communication protocol, etc.), memory 206, optionally a digital-to-analog converter (DAC) 204 for converting digital values to an analog signal (e.g., a portion of an integrated or partially integrated DAC/ADC), optionally a $V_{SPD}$ monitoring circuitry 203 configured to detect an under or over voltage event as to $V_{SPD}$ (e.g., $V_{SPD}$ 156, FIG. 1A), and one or more communication buses 208 for interconnecting these components. Communication buses 208, optionally, include circuitry (sometimes called a chipset) that interconnects and controls communications between system components. In some embodiments, supervisory controller 124 is coupled with host interface 122, power fail module 126, power control 127, memory controller 128, NVM controllers 130 (e.g., NVM controllers 130-1 through 130-m), and firmware store 207 by communication buses 208.

Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206, optionally, includes one or more storage devices remotely located from processor(s) 202. Memory 206, or alternately the non-volatile memory device(s) within memory 206, comprises a non-transitory computer readable storage medium. In some embodiments, memory 206, or the computer readable storage medium of memory 206, stores the following programs, modules, and data structures, or a subset or superset thereof:

reversion module 210 that is used for firmware reversion for a plurality of controllers on the storage device (e.g., memory controller 128 and NVM controllers 130, FIG. 1A), optionally including:
 detection module 212 that is used for detecting a reversion trigger, the reversion trigger identifying a set of one or more controllers of the plurality of controllers on the storage device;
 initiating module 214 that is used for initiating recovery actions, in response to the reversion trigger, for each controller in the set of one or more controllers;
 revert signal module 216 that is used for asserting a respective revert signal to each controller in the set of one or more controllers to execute a firmware reversion; and
 reset module 218 that is used for resetting each controller in the set of one or more controllers subsequent to asserting the respective revert signal;
power fail operation module 220 that is used for performing a power fail operation in accordance with a power fail condition, optionally including:
 signal module 222 that is used for signaling a power fail condition to a plurality of controllers on the storage device (e.g., memory controller 128 and NVM controllers 130, FIG. 1A);
 reset module 224 that is used for resetting the plurality of controllers on the storage device; and
 power removal module 226 that is used for removing power from the plurality of controllers on the storage device (e.g., by controlling power control 127, FIG. 1A); and
non-volatile memory 228 for storing information related to the operations of the storage device, optionally including:
 event log 230 for storing information related to events on the storage device (e.g., the time and occurrence of a power fail condition); and
 basic firmware 232 that includes boot software to allow supervisory controller 124 to boot firmware from a non-volatile firmware store (e.g., firmware store 207).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, include instructions for implementing any of the methods described below with reference to FIGS. 4A-4C.

In some embodiments, firmware store 207 is a non-volatile firmware store that contains multiple versions of firmware. For example, in some embodiments, firmware store 207 has two versions of firmware for supervisory controller 124. In some embodiments, one of the versions of firmware in firmware store 207 is an original production level firmware for supervisory controller 124. In some embodiments, one of the versions of firmware in firmware store 207 is an earlier valid version of the firmware for supervisory controller 124. In some embodiments, one of the versions of firmware in firmware store 207 is the currently-used firmware for supervisory controller 124. In some embodiments, a revert signal indicates to basic firmware 232 which version of firmware to load from firmware store 207 at power-up. For example, in some embodiments, if the revert signal is logically false, basic firmware 232 loads the currently-used firmware for supervisory controller 124, but if the revert signal is logically true, basic firmware 232 loads the original production level firmware for supervisory controller 124.

In some embodiments, new firmware is loaded onto firmware store 207 using an SPD bus (e.g., SPD Bus 154, FIG. 1A). In some embodiments, firmware store 207 is an external NOR flash. Although in FIG. 2A, firmware store 207 is shown as an external module to supervisory controller 124, in some embodiments, firmware store 207 is implemented in the internal memory of supervisory controller 124 (e.g., in non-volatile memory 228).

Although FIG. 2A shows supervisory controller 124 in accordance with some embodiments, FIG. 2A is intended more as a functional description of the various features which may be present in supervisory controller 124 than as a structural schematic of the embodiments described herein. In practice, and as recognized by those of ordinary skill in the art, items shown separately could be combined and some items could be separated.

Figure 2B:
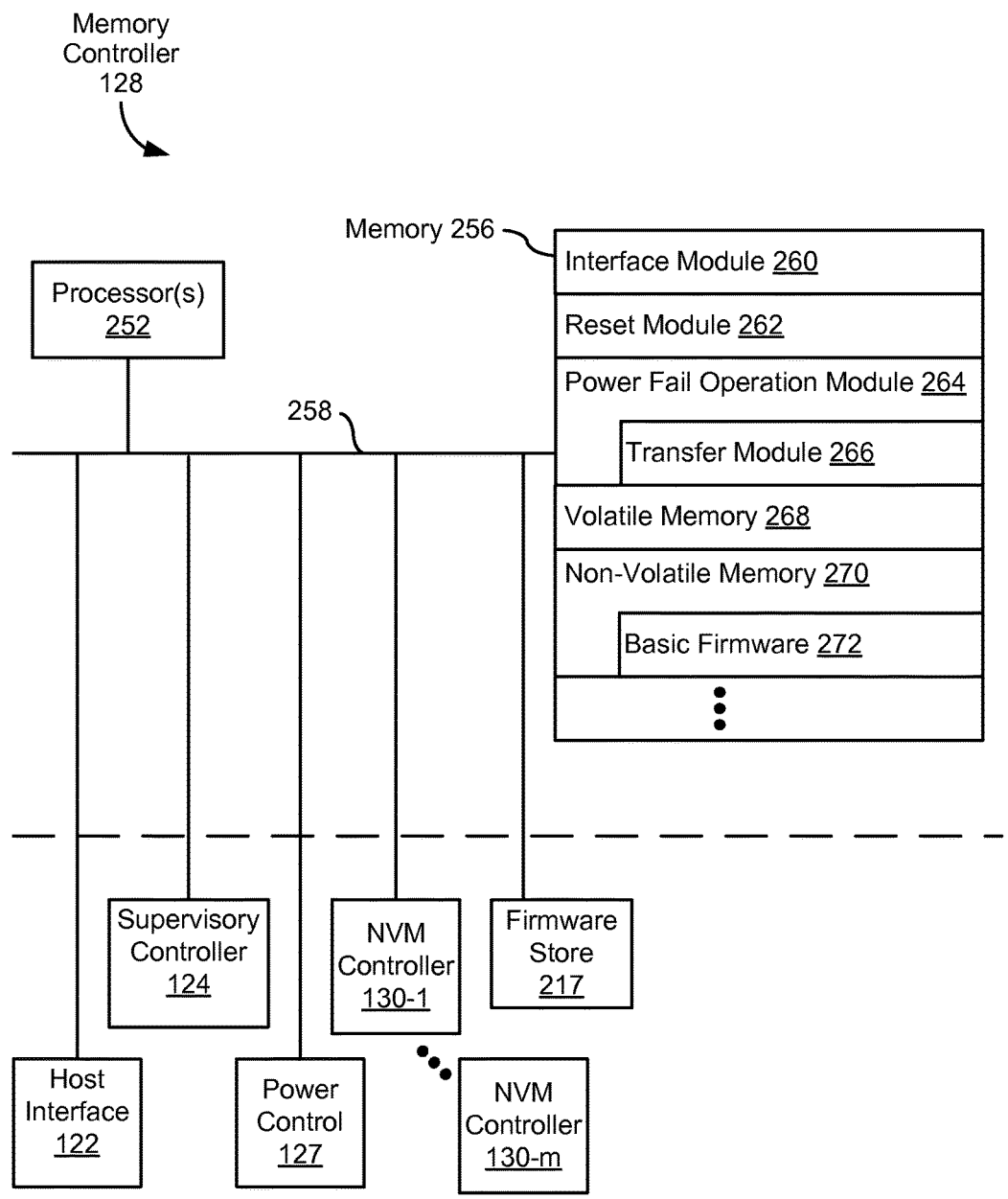
FIG. 2B is a block diagram illustrating an implementation of a memory controller, in accordance with some embodiments.

FIG. 2B is a block diagram illustrating an implementation of memory controller 128, in accordance with some embodiments. Memory controller 128, typically, includes one or more processors 252 (sometimes called CPUs or processing units or microprocessors or microcontrollers) for executing modules, programs and/or instructions stored in memory 256 and thereby performing processing operations, memory 256, and one or more communication buses 258 for interconnecting these components. Communication buses 258, optionally, include circuitry (sometimes called a chipset) that interconnects and controls communications between system components. In some embodiments, memory controller 128 is coupled with host interface 122, supervisory controller 124, power control 127, NVM controllers 130 (e.g., NVM controllers 130-1 through 130-m), and firmware store 217 by communication buses 258.

Memory 256 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 256, optionally, includes one or more storage devices remotely located from processor(s) 252. Memory 256, or alternately the non-volatile memory device(s) within memory 256, comprises a non-transitory computer readable storage medium. In some embodiments, memory 256, or the computer readable storage medium of memory 256, stores the following programs, modules, and data structures, or a subset or superset thereof:

interface module 260 for communicating with other components, such as host interface 122, supervisory controller 124, power control 127, NVM controllers 130, and firmware store 217;
 reset module 262 for resetting memory controller 128;
 power fail module 264 for performing a power fail operation in response to a signal of a power fail condition from supervisory controller 124;
 volatile memory 268 for storing data; and
 non-volatile memory 270 for storing data, optionally including:
  basic firmware 272 that includes boot software to allow memory controller 128 to boot firmware from a non-volatile firmware store (e.g., firmware store 217).

In some embodiments, power fail module 264, optionally, includes a transfer module 266 for transferring data held in volatile memory 268 to non-volatile memory.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 256 may store a subset of the modules and data structures identified above. Furthermore, memory 256 may store additional modules and data structures not described above. In some embodiments, the programs, modules, and data structures stored in memory 256, or the computer readable storage medium of memory 256, include instructions for implementing respective operations in the methods described below with reference to FIGS. 4A-4C.

In some embodiments, firmware store 217 is a non-volatile firmware store that contains multiple versions of firmware. For example, in some embodiments, firmware store 217 has two versions of firmware for memory controller 128. In some embodiments, one of the versions of firmware in firmware store 217 is an original production level firmware for memory controller 128. In some embodiments, one of the versions of firmware in firmware store 217 is an earlier valid version of the firmware for memory controller 128. In some embodiments, one of the versions of firmware in firmware store 217 is the currently-used firmware for memory controller 128. In some embodiments, a revert signal (e.g., revert signal 182) indicates to basic firmware 272 which version of firmware to load from firmware store 217 at power-up. For example, in some embodiments, if the revert signal is logically false (e.g., the signal is high), basic firmware 272 loads the currently-used firmware for memory controller 128, but if the revert signal is logically true (e.g., the signal is low), basic firmware 272 loads the original production level firmware for memory controller 128.

In some embodiments, new firmware is loaded onto firmware store 217 using an SPD bus (connection not shown). In some embodiments, firmware store 217 is an external NOR flash. Although in FIG. 2B, firmware store 217 is shown as an external module to memory controller 128, in some embodiments, firmware store 217 is implemented in the internal memory of memory controller 128 (e.g., in non-volatile memory 270).

Although FIG. 2B shows memory controller 128 in accordance with some embodiments, FIG. 2B is intended more as a functional description of the various features which may be present in memory controller 128 than as a structural schematic of the embodiments described herein. In practice, and as recognized by those of ordinary skill in the art, items shown separately could be combined and some items could be separated.

Figure 2C:
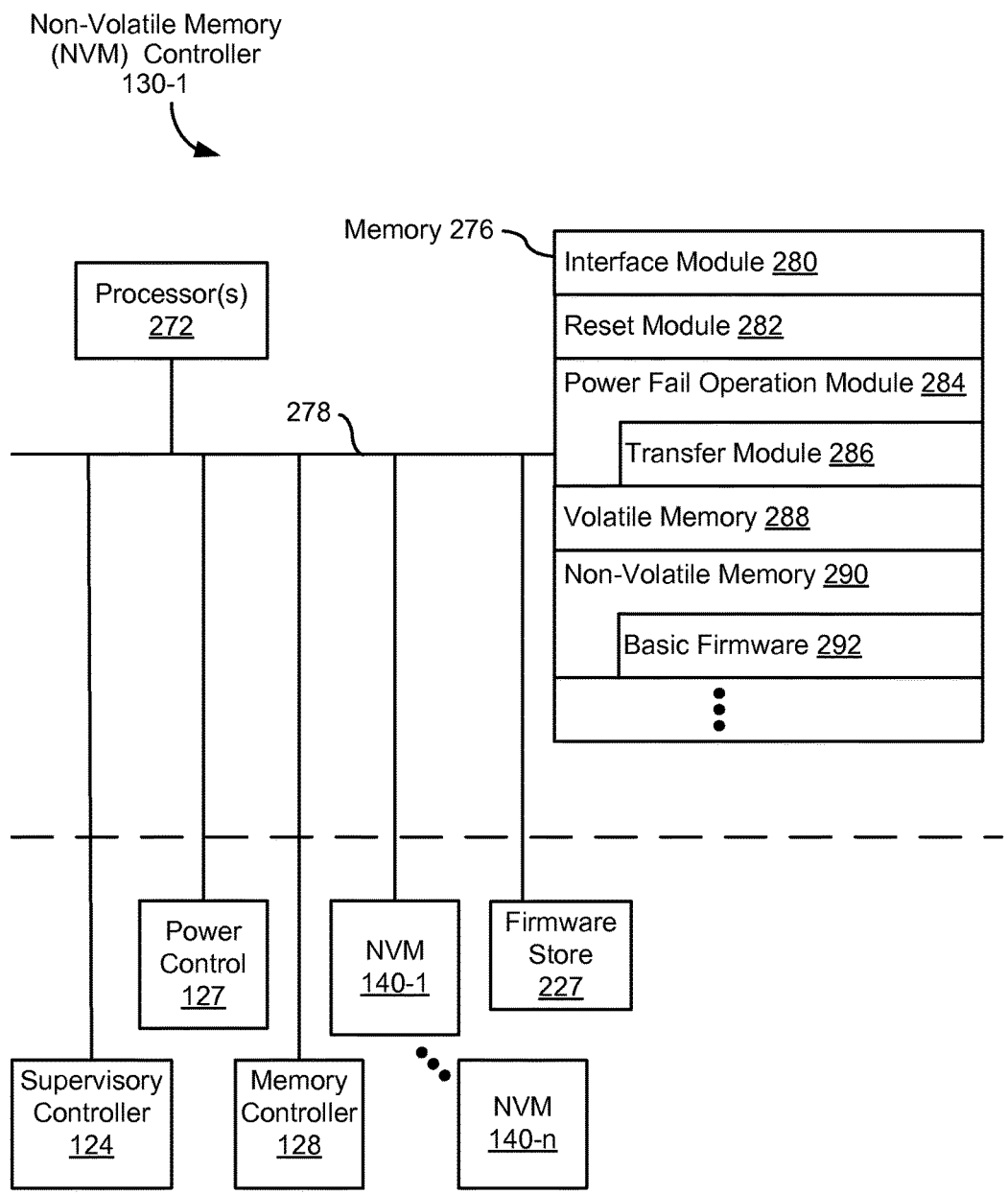
FIG. 2C is a block diagram illustrating an implementation of a non-volatile memory (NVM) controller, in accordance with some embodiments.

FIG. 2C is a block diagram illustrating an implementation of representative NVM controller 130-1, in accordance with some embodiments. NVM controller 130-1 typically includes one or more processors 272 (sometimes called CPUs or processing units or microprocessors or microcontrollers) for executing modules, programs and/or instructions stored in memory 276 and thereby performing processing operations, memory 276, and one or more communication buses 278 for interconnecting these components. Communication buses 278 optionally include circuitry (sometimes called a chipset) that interconnects and controls communications between system components. In some embodiments, NVM controller 130-1 is coupled with supervisory controller 124, power control 127, memory controller 128, NVM devices 140 (e.g., NVM devices 140-1 through 140-n), and firmware store 227 by communication buses 278.

Memory 276 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 276, optionally, includes one or more storage devices remotely located from processor(s) 272. Memory 276, or alternately the non-volatile memory device(s) within memory 276, comprises a non-transitory computer readable storage medium. In some embodiments, memory 276, or the computer readable storage medium of memory 276, stores the following programs, modules, and data structures, or a subset or superset thereof:
- interface module 280 for communicating with other components, such as supervisory controller 124, power control 127, memory controller 128, NVM devices 140, and firmware store 227;
- reset module 282 for resetting NVM controller 130-1;
- power fail module 284 for performing a power fail operation in response to a signal of a power fail condition from supervisory controller 124;
- volatile memory 288 for storing data; and
- non-volatile memory 290 for storing data, optionally including:
  - basic firmware 292 that includes boot software to allow NVM controller 130-1 to boot firmware from a non-volatile firmware store (e.g., firmware store 227).

In some embodiments, power fail module 284, optionally, includes a transfer module 286 for transferring data held in volatile memory 288 to non-volatile memory.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 276 may store a subset of the modules and data structures identified above. Furthermore, memory 276 may store additional modules and data structures not described above. In some embodiments, the programs, modules, and data structures stored in memory 276, or the computer readable storage medium of memory 276, include instructions for implementing respective operations in the methods described below with reference to FIGS. 4A-4C.

In some embodiments, firmware store 227 is a non-volatile firmware store that contains multiple versions of firmware. For example, in some embodiments, firmware store 227 has two versions of firmware for NVM controller 130-1. In some embodiments, one of the versions of firmware in firmware store 227 is an original production level firmware for NVM controller 130-1. In some embodiments, one of the versions of firmware in firmware store 227 is an earlier valid version of the firmware for NVM controller 130-1. In some embodiments, one of the versions of firmware in firmware store 227 is the currently-used firmware for NVM controller 130-1. In some embodiments, a revert signal (e.g., revert signal 184-1) indicates to basic firmware 292 which version of firmware to load from firmware store 227 at power-up. For example, in some embodiments, if the revert signal is logically false (e.g., the signal is high), basic firmware 292 loads the currently-used firmware for NVM controller 130-1, but if the revert signal is logically true (e.g., the signal is low), basic firmware 292 loads the original production level firmware for NVM controller 130-1.

In some embodiments, new firmware is loaded onto firmware store 227 using an SPD bus (connection not shown). In some embodiments, firmware store 227 is an external NOR flash. Although in FIG. 2C, firmware store 227 is shown as an external module to NVM controller 130-1, in some embodiments, firmware store 227 is implemented in the internal memory of NVM controller 130-1 (e.g., in non-volatile memory 290).

Although FIG. 2C shows NVM controller 130-1 in accordance with some embodiments, FIG. 2C is intended more as a functional description of the various features which may be present in NVM controller 130-1 than as a structural schematic of the embodiments described herein. In practice, and as recognized by those of ordinary skill in the art, items shown separately could be combined and some items could be separated. Further, although FIG. 2C shows representative NVM controller 130-1, the description of FIG. 2C similarly applies to other NVM controllers (e.g., NVM controllers 130-2 through 130-m) in storage device 120, as shown in FIG. 1A.

Figure 3:
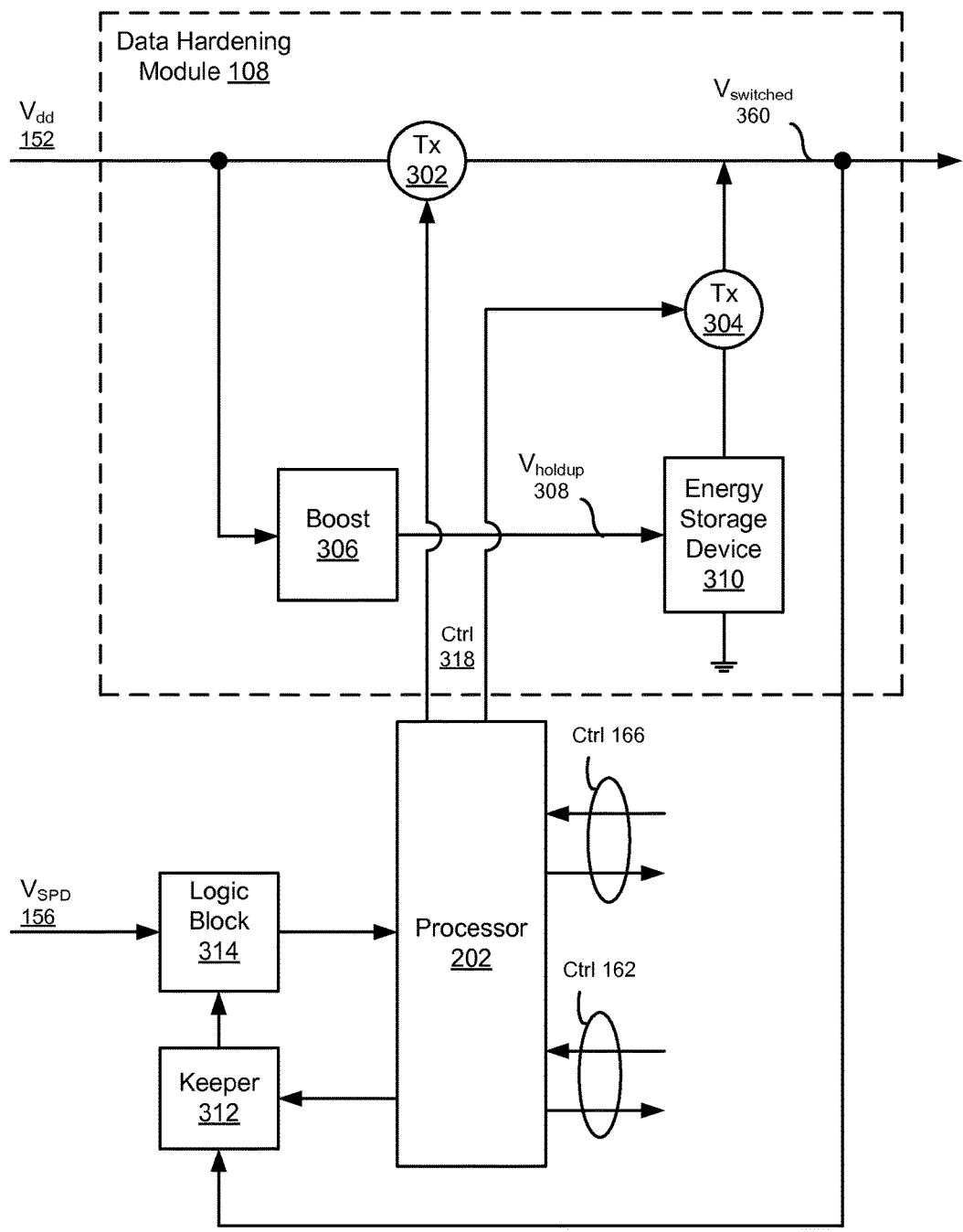
FIG. 3 is a block diagram illustrating an implementation of a data hardening module, in accordance with some embodiments.

FIG. 3 is a block diagram illustrating an implementation of data hardening module 108, in accordance with some embodiments. While some example features are illustrated, various other features have not been illustrated for the sake of brevity and so as not to obscure more pertinent aspects of the example implementations disclosed herein. To that end, as a non-limiting example, data hardening module 108 includes transistors 302 and 304, boost circuitry 306, and energy storage device 310.

In some embodiments, $V_{holdup}$ 308 is a boosted voltage, higher than $V_{dd}$ 152, and has a target value of 5.7 volts. In some embodiments, $V_{holdup}$ 308 is used to charge an energy storage device 310 (e.g., one or more hold-up capacitors). Further, in some embodiments, only one of transistors 302, 304 is enabled at any one time. In some embodiments, data hardening module 108's energy storage device 310 stores, immediately prior to a power fail condition being detected, at least approximately 30 to 70 mJ of energy per NVM controller 130 in storage device 120.

In some embodiments, supervisory controller 124 or a component thereof (e.g., processor 202) monitors and manages the functionality of data hardening module 108.

For example, in response to a power fail condition (e.g., in response to a reversion trigger), supervisory controller 124 or a component thereof (e.g., processor 202) is configured to perform one or more operations of a power fail process including controlling transistors 302 and 304 so that $V_{switched}$ 360 is the voltage from energy storage device 310, and energy storage device 310 is used (sometimes said to be "discharged") to provide power to storage device 120.

In some embodiments, during regular operation of storage device 120, $V_{dd}$ 152 is used to supply power to storage device 120. However, during the power fail process, energy storage device 310 is used to provide power to storage device 120. In some embodiments, supervisory controller 124 or a component thereof (e.g., processor 202) controls transistors 302 and 304 via control lines 318 to control $V_{switched}$ 360 to be voltage from $V_{dd}$ 152 (e.g., during regular operation) or voltage from energy storage device 310 (e.g., during the power fail process). For example, during regular operation of storage device 120, transistor 302 is turned on (e.g., to complete the connection between $V_{dd}$ 152 and $V_{switched}$ 360) and transistor 304 is turned off (e.g., to disable the connection between energy storage device 310 and $V_{switched}$ 360) so that $V_{dd}$ 152 is used to supply power to storage device 120. However, during the power fail process, transistor 302 is turned off (e.g., to disable the connection between $V_{dd}$ 152 and $V_{switched}$ 360) and transistor 304 is turned on (e.g., to enable the connection between energy storage device 310 and $V_{switched}$ 360) so that energy storage device 310 is used to provide power to storage device 120. Although a single energy storage device 310 is shown in FIG. 3, any energy storage device, including one or more capacitors, one or more inductors, or one or more other passive elements that store energy, may be used to store energy to be used during the power fail process.

In some embodiments, energy storage device 310 is charged using $V_{holdup}$ 308, a voltage higher than $V_{dd}$ 152. In some embodiments, $V_{dd}$ 152 is boosted up to $V_{holdup}$ 308 using boost circuitry 306 (e.g., 1.35 volts or 1.5 volts is boosted up to 5.7 volts). In some embodiments, boost circuitry 306 is controlled and enabled by supervisory controller 124 (e.g., via processor 202).

Further, in some embodiments, $V_{switched}$ 360 is used as an input to keeper circuitry 312, which along with $V_{SPD}$ 156 provides power to processor 202. During the power fail process, $V_{switched}$ 360 is provided via keeper circuitry 312 to processor 202 so as to provide power to processor 202. In some embodiments, $V_{SPD}$ 156 provides power to keeper circuitry 312. In some embodiments, logic block 314 (e.g., OR or XOR) determines which of keeper circuitry 312 or $V_{SPD}$ 156 provides power to supervisory controller 124 (e.g., processor 202).

Furthermore, in some embodiments, during a power up sequence, $V_{SPD}$ 156 is provided to storage device 120 before $V_{dd}$ 152 is provided to storage device 120. This allows devices in storage device 120 (e.g., supervisory controller 124 and, in turn, processor 202) to operate before main power $V_{dd}$ 152 is provided to storage device 120. In some embodiments, supervisory controller 124 or a component thereof (e.g., processor 202) includes one or more connections 162, 166 used to monitor and control other functions within storage device 120. For example, in some embodiments, connections 162 are used to monitor and control memory controller 128 and connections 166 are used to monitor and control NVM controllers 130.

Figure 4A:
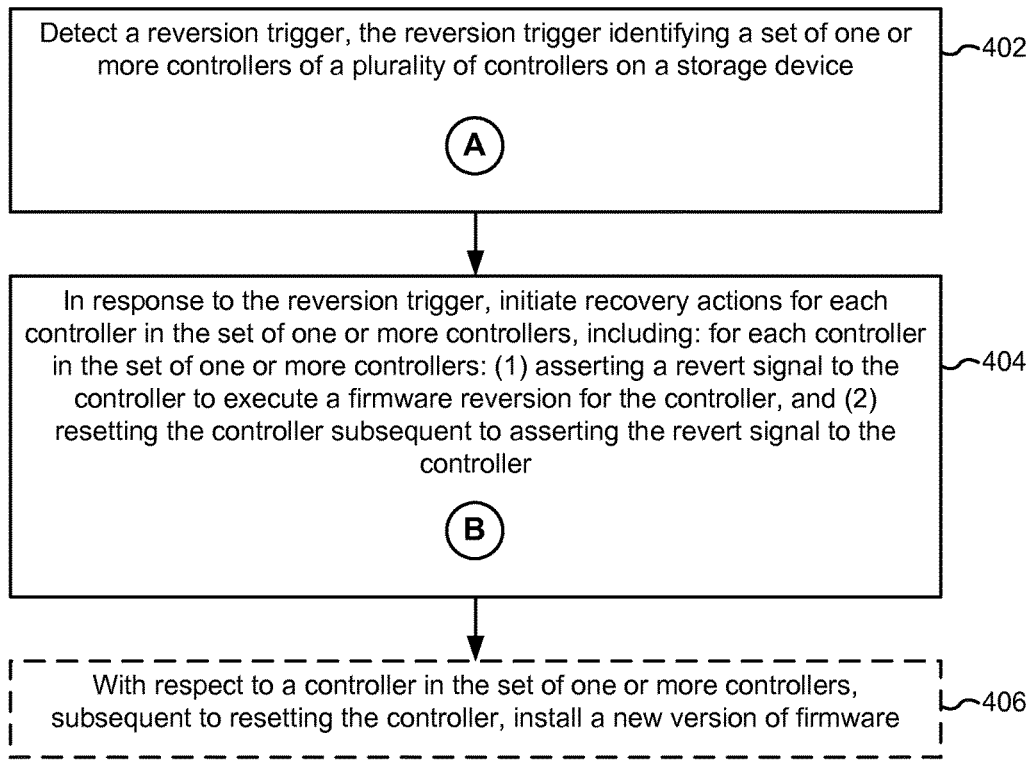
Figure 4B:
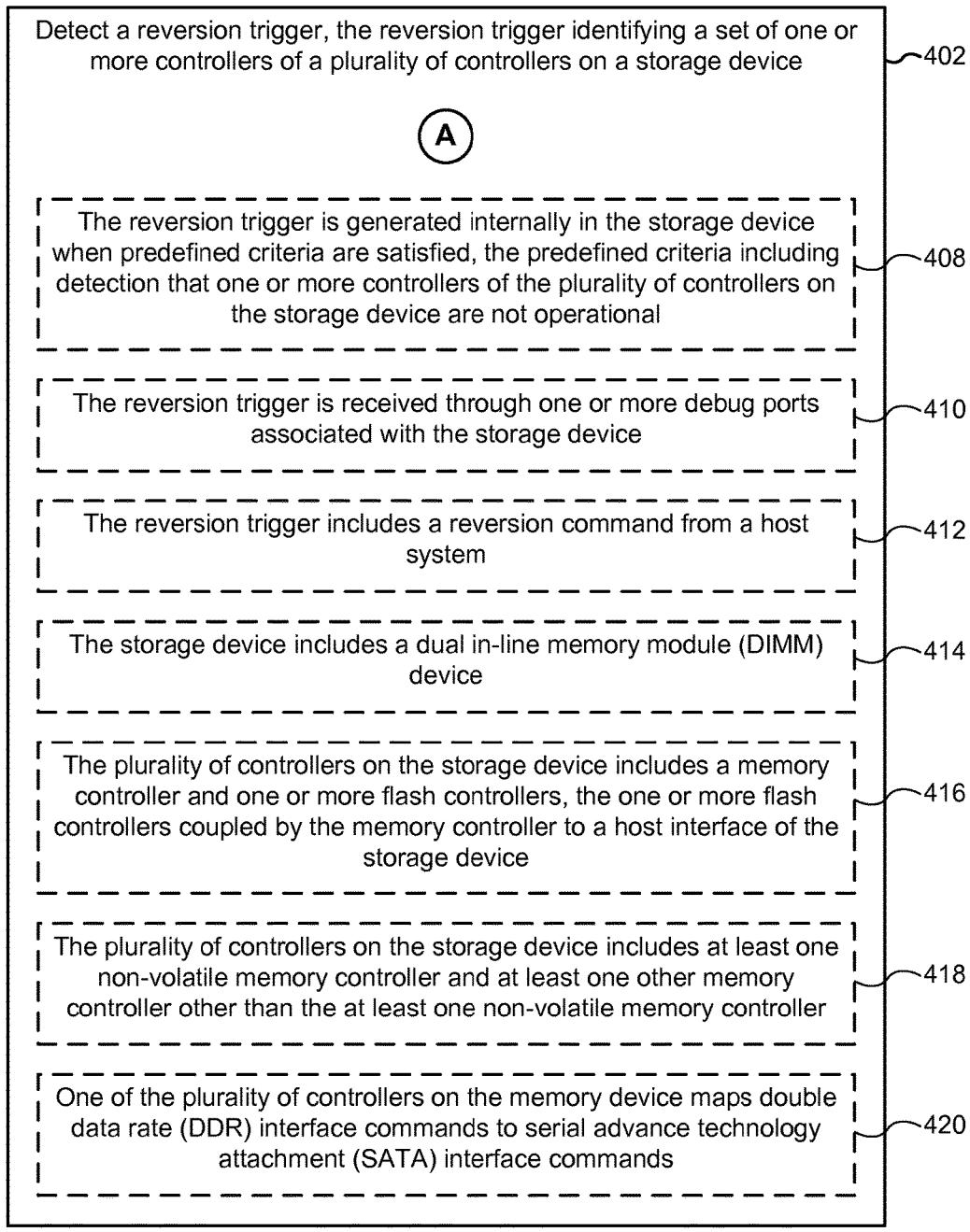

FIGS. 4A-4C illustrate a flowchart representation of method 400 of recovery in a storage device, in accordance with some embodiments. At least in some embodiments, method 400 is performed by a storage device (e.g., storage device 120, FIG. 1A) or one or more components of the storage device (e.g., supervisory controller 124, power fail module 126, memory controller 128, and/or NVM controllers 130, FIG. 1A), where the storage device is operatively coupled with a host system (e.g., computer system 110, FIG. 1A). In some embodiments, method 400 is governed by instructions that are stored in a non-transitory computer readable storage medium and that are executed by one or more processors of a device, such as the one or more processors 202 of supervisory controller 124, the one or more processors 252 of memory controller 128, and/or the one or more processors 272 of NVM controllers 130, as shown in FIGS. 2A-2C.

A storage device (e.g., storage device 120, FIG. 1A) detects (402) a reversion trigger, the reversion trigger identifying a set of one or more controllers of a plurality of controllers on the storage device. In some embodiments, the reversion trigger is a single reversion trigger identifying the set of one or more controllers to recover. In some embodiments, the reversion trigger is a set of one or more reversion triggers, each identifying one or more controllers to recover, respectively. In some embodiments, a detection module (e.g., detection module 212, FIG. 2A) is used to detect a reversion trigger, the reversion trigger identifying a set of one or more controllers of a plurality of controllers on the storage device, as described above with respect to FIG. 2A.

In some embodiments, the reversion trigger is (408) generated internally in the storage device when predefined criteria are satisfied, the predefined criteria including detection that one or more controllers of the plurality of controllers on the storage device (e.g., memory controller 128 and NVM controllers 130, FIG. 1A) are not operational. In some embodiments, detection that one or more controllers of the plurality of controllers on the storage device are not operational includes monitoring the operational state of the plurality of controllers on the storage device. In some embodiments, if an improper state is detected, a supervisory controller (e.g., supervisory controller 124, FIG. 1A) determines which controller is non-operational (e.g., hung) and initiates recovery actions for the non-operational controller. In some embodiments, the supervisory controller determines that one or more controllers (e.g., one, several, or all of the controllers of the plurality of controllers) are non-operational and determines the appropriate set of one or more controllers to recover. In some embodiments, detection that one or more controllers on the storage device are not operational includes failing to receive a status signal from the one or more controllers in a predetermined time period.

In some embodiments, the reversion trigger is (410) received through one or more debug ports (e.g., debug ports

170, 172, 174, FIG. 1B) associated with the storage device. In some embodiments, a user (e.g., a Field Application Engineer) determines which controller(s) of the plurality of controllers are hung and the reversion trigger is an external user command communicated to the storage device via one or more debug ports that are external to the storage device. In some embodiments, a supervisory controller (e.g., supervisory controller 124, FIG. 1B) receives the external user command via a debug port. For example, if the user determines that memory controller 128 is hung, in some embodiments, the user communicates a reversion trigger via debug port 170 that identifies memory controller 128 as the controller to recover.

In some embodiments, the reversion trigger includes (412) a reversion command from a host system (e.g., computer system 110, FIG. 1A). In some embodiments, the reversion command from the host system is sent to the storage device if the host system determines the storage device is non-operational. In some embodiments, the reversion command from the host system specifies which controller(s) of the plurality of controllers on the storage device are not operational. In some embodiments, the reversion command from the host system is communicated over a system management bus (SMBus) (e.g., SPD Bus 154, FIG. 1A). In some embodiments, the reversion command from the host system enables selective power cycling in order to recover a particular storage device.

In some embodiments, the storage device includes (414) a dual in-line memory module (DIMM) device. In some embodiments, the storage device is compatible with a DIMM memory slot. For example, in some embodiments, the storage device is compatible with a 240-pin DIMM memory slot using a DDR3 interface specification. In some embodiments, the storage device includes a non-volatile memory DIMM device. In some embodiments, the storage device includes a single in-line memory module (SIMM) or other types of storage devices.

In some embodiments, the storage device includes one or more three-dimensional (3D) memory devices (e.g., NVM devices 140, 142, FIG. 1A), as further defined herein. In some embodiments, the 3D memory devices are coupled to one or more controllers (e.g., NVM controllers 130, FIG. 1A).

In some embodiments, the plurality of controllers on the storage device includes (416) a memory controller (e.g., memory controller 128, FIG. 1A) and one or more flash controllers (e.g., NVM controllers 130, FIG. 1A). In some embodiments, the one or more flash controllers are coupled by the memory controller to a host interface (e.g., host interface 122, FIG. 1A) of the storage device.

In some embodiments, the plurality of controllers on the storage device includes (418) at least one non-volatile memory controller and at least one other memory controller other than the at least one non-volatile memory controller. In some embodiments, the at least one non-volatile memory controller is a NVM controller (e.g., NVM controller 130-1, FIG. 1A). In some embodiments, the at least one non-volatile memory controller is a flash controller. In some embodiments, the at least one non-volatile memory controller controls one or more other types of non-volatile memory devices.

In some embodiments, one of the plurality of controllers on the storage device maps (420) double data rate (DDR) interface commands to serial advance technology attachment (SATA) interface commands. For example, a memory controller (e.g., memory controller 128, FIG. 1A) maps double data rate type three (DDR3) interface commands to SATA interface commands. In some embodiments, a memory controller (e.g., memory controller 128, FIG. 1A) uses a defined interface standard, such as DDR3, to communicate with a host interface (e.g., host interface 122, FIG. 1A) and uses a defined interface standard, such as SATA, to communicate with other controllers on the storage device (e.g., NVM controllers 130, FIG. 1A).

The storage device, in response to the reversion trigger, initiates (404) recovery actions for each controller in the set of one or more controllers, including: for each controller in the set of one or more controllers: (1) asserting a revert signal to the controller to execute a firmware reversion for the controller, and (2) resetting the controller subsequent to asserting the revert signal to the controller. In some embodiments, asserting the revert signal includes changing the revert signal to logically true. For example, if memory controller 128 (FIG. 1B) is in the set of one or more controllers, asserting the revert signal includes changing revert signal 182 (FIG. 1B) to logically true. In some embodiments, executing a firmware reversion for the controller includes reverting back to an original production level firmware (e.g., an original factory version of the firmware). In some embodiments, executing a firmware reversion for the controller includes executing the original production level firmware (e.g., the original factory version of the firmware) for the controller during the next power-up cycle. In some embodiments, executing a firmware reversion for the controller includes reverting back to an earlier valid version of the firmware. In some embodiments, executing a firmware reversion for the controller includes reverting back to a pre-existing version of firmware. In some embodiments, executing a firmware reversion for the controller includes reverting back to a pre-stored version of firmware. In some embodiments, executing a firmware reversion for the controller includes executing a download program that allows the controller to download a new version of firmware. In some embodiments, an initiating module (e.g., initiating module 214, FIG. 2A) is used to initiate recovery actions, in response to the reversion trigger, for each controller in the set of one or more controllers, as described above with respect to FIG. 2A. In some embodiments, a revert signal module (e.g., revert signal module 216, FIG. 2A) is used to, for each controller in the set of one or more controllers, assert a revert signal to the controller to execute a firmware reversion for the controller, as described above with respect to FIG. 2A. In some embodiments, a reset module (e.g., reset module 218, FIG. 2A) is used to, for each controller in the set of one or more controllers, reset the controller subsequent to asserting the revert signal to the controller, as described above with respect to FIG. 2A.

In some embodiments, initiating recovery actions further includes, with respect to a controller in the set of one or more controllers, prior to resetting the controller, performing (422) a power fail operation for the controller, the power fail operation including: (1) signaling a power fail condition to the controller, and (2) transferring data held in volatile memory to non-volatile memory. In some embodiments, the power fail operation includes signaling the power fail condition to a plurality of controllers on the storage device (e.g., memory controller 128 and NVM controllers 130, FIG. 1A). In some embodiments, a signal module (e.g., signal module 222, FIG. 2A) is used to signal a power fail condition to the controller, as described above with respect to FIG. 2A. In some embodiments, a power fail operation module on one or more controllers (e.g., power fail operation module 264, FIG. 2B, and power fail operation module 284, FIG. 2C) are used to transfer data held in volatile memory to non-volatile memory, as described above with respect to FIGS. 2B-2C.

In some embodiments, the storage device includes an energy storage device (e.g., energy storage device 310, FIG. 3), and the power fail operation is performed using power from the energy storage device. As described above with respect to FIG. 3, during a power fail operation, an energy storage device (e.g., energy storage device 310, FIG. 3) is used to provide power to the storage device, and data hardening circuitry (e.g., data hardening module 108, FIGS. 1B and 3) is used to connect and disconnect the appropriate power sources (e.g., disabling the connection between $V_{dd}$ 152 and $V_{switched}$ 360 and enabling the connection between energy storage device 310 and $V_{switched}$ 360, FIG. 3).

In some embodiments, the energy storage device includes one or more capacitors. For example, in some embodiments, the energy storage device includes a single capacitor, while in other embodiments, the energy storage device includes a plurality of capacitors. In some embodiments, the energy storage device includes one or more inductors. In some embodiments, the energy storage device includes one or more other passive elements that store energy.

In some embodiments, transferring data held in volatile memory to non-volatile memory includes transferring data (e.g., volatile memory 268, FIG. 2B) from the memory controller (e.g., memory controller 128, FIG. 1A) to the one or more flash controllers (e.g., NVM controllers 130, FIG. 1A). In some embodiments, data transferred from the memory controller to the one or more flash controllers includes data in flight from the host interface (e.g., host interface 122, FIG. 1A) to the memory controller, data that has been signaled to the host (e.g., computer system 110, FIG. 1A) as saved (e.g., stored in a non-volatile store or write cache), and/or metadata stored in volatile memory (e.g., volatile memory 268, FIG. 2B) of the memory controller. In some embodiments, a transfer module (e.g., transfer module 266, FIG. 2B) is used to transfer data from the memory controller to the one or more flash controllers, as described above with respect to FIG. 2B.

In some embodiments, transferring data held in volatile memory to non-volatile memory includes transferring data (e.g., volatile memory 288, FIG. 2C) from the one or more flash controllers (e.g., NVM controllers 130, FIG. 1A) to the non-volatile memory (e.g., NVM devices 140, 142, FIG. 1A). In some embodiments, data transferred from the one or more flash controllers to the non-volatile memory includes data in flight to the one or more flash controllers and/or metadata stored in volatile memory (e.g., volatile memory 288, FIG. 2C) of the one or more flash controllers (e.g., unwritten parity data, information about current age of the flash memory devices, translation tables, etc.). In some embodiments, a transfer module (e.g., transfer module 286, FIG. 2C) is used to transfer data from the one or more flash controllers to the non-volatile memory, as described above with respect to FIG. 2C.

In some embodiments, the non-volatile memory comprises (424) one or more flash memory devices (e.g., NVM devices 140, 142, FIG. 1A). In some embodiments, the non-volatile memory includes a single flash memory device, while in other embodiments the non-volatile memory includes a plurality of flash memory devices. In some embodiments, the non-volatile memory includes NAND-type flash memory or NOR-type flash memory. In other embodiments, the non-volatile memory comprises one or more other types of non-volatile storage devices.

In some embodiments, the non-volatile memory includes one or more three-dimensional (3D) memory devices (e.g., NVM devices 140, 142, FIG. 1A), as further defined herein. In some embodiments, the 3D memory devices are coupled to one or more controllers (e.g., NVM controllers 130, FIG. 1A).

In some embodiments, with respect to a controller in the set of one or more controllers, the revert signal is (426) a dedicated general purpose I/O (GPIO) signal associated with the controller. In some embodiments, the controller is a memory controller (e.g., memory controller 128, FIG. 1B), and the revert signal (e.g., revert signal 182, FIG. 1B) is a dedicated memory controller GPIO signal. In some embodiments, for example, the dedicated memory controller GPIO signal is normally logically false, and if the GPIO signal is ever asserted logically true during power up, the memory controller will revert to running its original production level firmware (e.g., its original factory version of the firmware). In some embodiments, the controller is a non-volatile memory (NVM) controller (e.g., NVM controller 130-1, FIG. 1B), and the revert signal (e.g., revert signal 184-1, FIG. 1B) is a dedicated NVM GPIO signal. In some embodiments, for example, the dedicated NVM GPIO is normally logically false, and if the GPIO signal is ever asserted logically true during power up, the NVM controller will revert to running its original production level firmware (e.g., its original factory version of the firmware). In some embodiments, if there are two or more NVM controllers, each NVM controller has its own dedicated NVM GPIO signal. In some embodiments, the original production level firmware for a first controller (e.g., a memory controller) of the plurality of controllers is different from the original production level firmware for a second controller (e.g., a NVM controller) of the plurality of controllers.

In some embodiments, with respect to a controller in the set of one or more controllers, the revert signal is (428) asserted using an out-of-band signaling technique. In some embodiments, a supervisory controller (e.g., supervisory controller 124, FIG. 1B) of the storage device asserts the revert signal by generating signaling bits that are sent in a special order to the controller. In some embodiments, this out-of-band signaling technique is substituted for the GPIO pin approach to triggering a firmware reversion. For further description of out-of-band signaling, see U.S. Provisional patent application Ser. No. 13/851,928, filed Mar. 27, 2013, entitled "Electronic System With System Modification Control Mechanism And Method Of Operation Thereof," which is incorporated by reference herein in its entirety.

In some embodiments, a controller of the set of one or more controllers is (430) a non-volatile memory (NVM) controller (e.g., NVM controller 130-1, FIG. 1B), and the revert signal (e.g., revert signal 184-1, FIG. 1B) is a universal asynchronous receiver/transmitter (UART) transmit (Tx) signal. In some embodiments, the NVM controller has a UART port that is externalized via a debug connector for serial port debugging. In some embodiments, to recover a non-operational (e.g., hung) NVM controller, its UART Tx pin is pulled to logically true (e.g., pulled to ground). In some embodiments, if there are two or more NVM controllers, each NVM controller has a respective UART port that is externalized via a respective debug connector.

In some embodiments, for each controller of the set of one or more controllers, prior to executing the firmware reversion for the controller, the controller uses (432) a first version of firmware, and subsequent to executing the firmware reversion for the controller, the controller uses a second version of firmware. For example, in some embodiments, prior to executing the firmware reversion for the controller, the controller uses a customer-specific firmware with additional features and commands, and subsequent to executing the firmware reversion for the controller, the controller uses a base-level firmware with basic functionality. Using memory controller 128 (FIGS. 1B and 2B) as an example, in some embodiments, prior to executing the firmware reversion for memory controller 128, memory controller 128 uses a first version of firmware (e.g., the currently-used firmware for memory controller 128 in firmware store 217), and subsequent to executing the firmware reversion for memory controller 128, memory controller 128 uses a second version of firmware (e.g., the original production level firmware for memory controller 128 in firmware store 217).

In some embodiments, the second version of firmware is (434) an earlier version of firmware than the first version of firmware. In some embodiments, the second version of firmware is an original production level firmware (e.g., an original factory version of the firmware). In some embodiments, the second version of firmware is a pre-existing version of firmware. In some embodiments, the second version of firmware is a pre-stored version of firmware. In some embodiments, the second version of firmware is an earlier valid version of the firmware. For example, in some embodiments, the first version of firmware is version 5.0 and the second version of firmware is version 4.0.

In some embodiments, the storage device, with respect to a controller in the set of one or more controllers, subsequent to resetting the controller, installs (406) a new version of firmware. In some embodiments, the firmware reversion leaves the controller with a basic firmware (e.g., original production level firmware with basic functionality). In some embodiments, the basic firmware allows download of a new version of firmware. In some embodiments, the new version of firmware is downloaded to a firmware store (e.g., firmware store 207, FIG. 2A, firmware store 217, FIG. 2B and/or firmware store 227, FIG. 2C). In some embodiments, the controller can download a new version of firmware while the storage device is operational. For example, in some embodiments, a NVM controller (e.g., NVM controller 130-1, FIG. 1B) can download a new version of firmware (e.g., to firmware store 227, FIG. 2C) while the other controllers (e.g., NVM controllers 130-2 through 130-m and memory controller 128, FIG. 1B) in the plurality of controllers are operational.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible (e.g., a NOR memory array). NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration (e.g., in an x-z plane), resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

The term "three-dimensional memory device" (or 3D memory device) is herein defined to mean a memory device having multiple memory layers or multiple levels (e.g., sometimes called multiple memory device levels) of memory elements, including any of the following: a memory device having a monolithic or non-monolithic 3D memory array, some non-limiting examples of which are described above; or two or more 2D and/or 3D memory devices, packaged together to form a stacked-chip memory device, some non-limiting examples of which are described above.

One of skill in the art will recognize that this invention is not limited to the two dimensional and three dimensional exemplary structures described but cover all relevant memory structures within the spirit and scope of the invention as described herein and as understood by one of skill in the art.

It will be understood that, although the terms "first," "second," etc. may be used herein to describe various elements, these elements should not be limited by these terms. These terms are only used to distinguish one element from another. For example, a first NVM controller could be termed a second NVM controller, and, similarly, a second NVM controller could be termed a first NVM controller, without changing the meaning of the description, so long as all occurrences of the "first NVM controller" are renamed consistently and all occurrences of the "second NVM controller" are renamed consistently. The first NVM controller and the second NVM controller are both NVM controllers, but they are not the same NVM controller.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of recovery in a storage device having a supervisory controller and a plurality of additional controllers, the method comprising:
    detecting, at the supervisory controller, a reversion trigger, the reversion trigger identifying a set of two or more controllers of the plurality of additional controllers on the storage device; and
    in response to detecting the reversion trigger, initiating, at the supervisory controller, recovery actions for each controller in the identified set of two or more controllers, including:
        for each controller in the identified set of two or more controllers:
            asserting a revert signal to the controller to execute a firmware reversion for the controller; and
            resetting the controller subsequent to asserting the revert signal to the controller.

2. The method of claim 1, wherein the reversion trigger is generated internally in the storage device when predefined criteria are satisfied, the predefined criteria including detection that two or more controllers of the plurality of additional controllers on the storage device are not operational.

3. The method of claim 1, wherein the reversion trigger is received through one or more debug ports associated with the storage device.

4. The method of claim 1, wherein the reversion trigger includes a reversion command from a host system.

5. The method of claim 1, wherein, with respect to a controller in the identified set of two or more controllers, the revert signal is a dedicated general purpose I/O (GPIO) signal associated with the controller.

6. The method of claim 1, wherein, with respect to a controller in the identified set of two or more controllers, the revert signal is asserted using an out-of-band signaling technique.

7. The method of claim 1, wherein:
a controller of the identified set of two or more controllers is a non-volatile memory (NVM) controller; and
the revert signal is a universal asynchronous receiver/transmitter (UART) transmit signal.

8. The method of claim 1, wherein, for each controller of the identified set of two or more controllers;
prior to executing the firmware reversion for the controller, the controller uses a first version of firmware; and
subsequent to executing the firmware reversion for the controller, the controller uses a second version of firmware.

9. The method of claim 8, wherein the second version of firmware is an earlier version of firmware than the first version of firmware.

10. The method of claim 1, further comprising:
with respect to a controller in the identified set of two or more controllers, subsequent to resetting the controller, installing a new version of firmware.

11. The method of claim 1, wherein the storage device includes a dual in-line memory module (DIMM) device.

12. The method of claim 1, wherein the plurality of additional controllers on the storage device includes:
a memory controller; and
one or more flash controllers, the one or more flash controllers coupled by the memory controller to a host interface of the storage device.

13. The method of claim 1, wherein the plurality of additional controllers on the storage device includes:
at least one non-volatile memory controller; and
at least one other memory controller other than the at least one non-volatile memory controller.

14. The method of claim 1, wherein one of the plurality of additional controllers on the storage device maps double data rate (DDR) interface commands to serial advanced technology attachment (SATA) interface commands.

15. A storage device, comprising:
an interface for operatively coupling the storage device with a host system;
a supervisory controller with one or more processors and memory; and
a plurality of additional controllers,
the storage device configured to:
detect, at the supervisory controller, a reversion trigger, the reversion trigger identifying a set of two or more controllers of the plurality of additional controllers on the storage device; and
in response to detecting the reversion trigger, initiate, at the supervisory controller, recovery actions for each controller in the identified set of two or more controllers, including:
for each controller in the identified set of two or more controllers:
asserting a revert signal to the controller to execute a firmware reversion for the controller; and
resetting the controller subsequent to asserting the revert signal to the controller.

16. The storage device of claim 15, wherein initiating recovery actions in response to detecting the reversion trigger further includes, with respect to a controller in the identified set of two or more controllers:
prior to resetting the controller, performing a power fail operation for the controller, the power fail operation including:
signaling a power fail condition to the controller; and
transferring data held in volatile memory to non-volatile memory.

17. The storage device of claim 15, wherein, for each controller of the identified set of two or more controllers;
prior to executing the firmware reversion for the controller, the controller uses a first version of firmware; and
subsequent to executing the firmware reversion for the controller, the controller uses a second version of firmware.

18. A non-transitory computer readable storage medium, storing one or more programs for execution by one or more processors of a storage device having a supervisory controller and a plurality of additional controllers, the one or more programs including instructions for:
detecting, at the supervisory controller, a reversion trigger, the reversion trigger identifying a set of two or more controllers of the plurality of additional controllers on the storage device; and
in response to detecting the reversion trigger, initiating, at the supervisory controller, recovery actions for each controller in the identified set of two or more controllers, including:
for each controller in the identified set of two or more controllers:
asserting a revert signal to the controller to execute a firmware reversion for the controller; and
resetting the controller subsequent to asserting the revert signal to the controller.

19. The non-transitory computer readable storage medium of claim 18, wherein the non-transitory computer readable storage medium includes:
a non-transitory computer readable storage medium associated with each of the plurality of additional controllers on the storage device; and
a non-transitory computer readable storage medium associated with the supervisory controller.

20. A method of recovery in a storage device having a supervisory controller and a plurality of additional controllers, the method comprising:
detecting, at the supervisory controller, a reversion trigger, the reversion trigger identifying a set of two or more controllers of the plurality of additional controllers on the storage device; and
in response to detecting the reversion trigger, initiating, at the supervisory controller, recovery actions for each controller in the identified set of two or more controllers, including:
for each controller in the identified set of two or more controllers:
asserting a revert signal to the controller to execute a firmware reversion for the controller;
performing a power fail operation for the controller, the power fail operation including:
signaling a power fail condition to the controller, and
transferring data held in volatile memory to non-volatile memory; and resetting the controller subsequent to asserting the revert signal to the controller and performing the power fail operation for the controller.

21. The method of claim 20, wherein the non-volatile memory comprises one or more flash memory devices.

22. The method of claim 20, wherein the non-volatile memory comprises one or more three-dimensional (3D) memory devices.

* * * * *